United States Patent
Uchikawa et al.

(10) Patent No.: US 6,330,553 B1
(45) Date of Patent: Dec. 11, 2001

(54) AUTONOMIC SYSTEM FOR UPDATING FUZZY NEURAL NETWORK AND CONTROL SYSTEM USING THE FUZZY NEURAL NETWORK

(75) Inventors: Yoshiki Uchikawa, Nagoga; Takeshi Furuhashi, Nisshin; Masashi Yamaguchi; Yoko Fujime, both of Iwata, all of (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/058,325

(22) Filed: Apr. 9, 1998

(30) Foreign Application Priority Data

Apr. 9, 1997 (JP) .................................................. 9-091115

(51) Int. Cl.$^7$ .................................................. G06F 15/18
(52) U.S. Cl. ...................... 706/2; 706/6; 706/9; 706/900; 706/903
(58) Field of Search ................................ 706/1–6, 8, 15, 706/16, 23, 25, 900, 903, 9

(56) References Cited

U.S. PATENT DOCUMENTS

| | | | |
|---|---|---|---|
| 5,416,888 | * 5/1995 | Shimokawa | 706/16 |
| 5,487,130 | * 1/1996 | Ichimori et al. | 706/61 |
| 5,524,599 | * 6/1996 | Kong et al. | 123/682 |
| 5,608,846 | * 3/1997 | Mitsubuchi et al. | 706/59 |
| 5,642,722 | * 7/1997 | Schumacher et al. | 123/673 |
| 5,761,384 | * 6/1998 | Inoue et al. | 706/2 |
| 5,828,812 | * 10/1998 | Khan et al. | 706/2 |
| 6,032,139 | * 2/2000 | Yamaguchi et al. | 706/13 |
| 6,064,996 | * 2/2000 | Yamaguchi et al. | 706/13 |

OTHER PUBLICATIONS

Bastian, "Modeling Fuel Injection Control Maps Using Fuzzy Logic," Proceedings of Third IEEE Conference on Fuzzy Systems, 1994. IEEE World Congress on Computational Intelligence, vol. 2, pp. 740–743 Jun. 1994.*

Buhusi, "Neural Learning in Automatic Fuzzy Systems Synthesis," Proceedings of 1993 International Joint Conference on Neural Networks, IJCNN '93–Nagoya, vol. 1, pp. 786–789 Oct. 1993.*

Shann et al., "A Fuzzy Neural Network for Rule Acquiring on Fuzzy Control Systems," Fuzzy Sets and Systems, vol. 71, pp. 345–357 1995.*

\* cited by examiner

*Primary Examiner*—George B. Davis
(74) *Attorney, Agent, or Firm*—Knobbe, Martens, Olson & Bear, LLP

(57) ABSTRACT

An autonomic system for updating a fuzzy neural network includes a process of calculating an estimated value based on fuzzy inference by using a neural network structure, wherein a parameter to be adjusted or identified by fuzzy inference and outputted from the neural network is made to correspond to coupling loads which are updated by learning, i.e., fuzzy rules and membership functions are adjusted by learning. This system is characterized in that the addition and deletion of fuzzy rules are conducted based on changes in output errors in an autonomic manner, thereby effectively obtaining appropriate numbers of fuzzy rules optimal for an object such as a vehicle engine having strong non-linearity. Fuzzy rules are formed by a combination of membership functions representing variables such as an engine speed and a throttle angle.

19 Claims, 23 Drawing Sheets

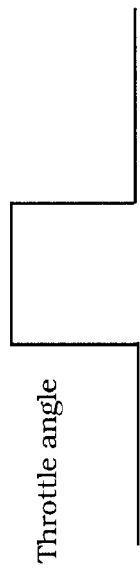

Throttle angle

Figure 22a

Exhaust A/F when volumetric efficiency, fuel deposition rate, and time constant of evaporation are correct.

Figure 22b

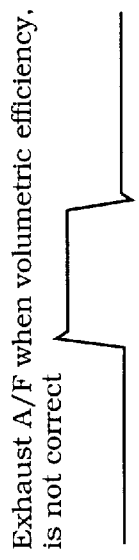

Exhaust A/F when volumetric efficiency, is not correct

Figure 22c

Exhaust A/F when fuel deposition rate and time constant of evaporation are not correct

Figure 22d

After learning at volumetric efficiency processing unit

After learning at fuel deposition rate/time constant-of-evaporation

AUTONOMIC SYSTEM FOR UPDATING FUZZY NEURAL NETWORK AND CONTROL SYSTEM USING THE FUZZY NEURAL NETWORK

BACKGROUND OF THE INVENTION

This invention relates to a system for updating a fuzzy neural network, and particularly to that for obtaining fuzzy rules provided in the neural network in an autonomic manner. The invention further relates to a control system using the fuzzy neural network which is highly responsive to various state changes.

Heretofore, a fuzzy neural network, formed by combining a fuzzy inference system and a neural network, has been known to possess the advantages of both a fuzzy inference system and a neural network. In the above, the fuzzy inference system allows linguistically descriptive algorithms including obscurity, such as decision by humans, using if-then type fuzzy rules. The neural network allows regulating any input-output relationship by updating coupling coefficients using a learning function.

The aforesaid fuzzy neural network allows, for example, modifying the shapes of a membership function by using a learning method such as a back provocation method, wherein a membership function in the first-half portion of a fuzzy inference system is constructed using, for example, a sigmoid function; and the central value and the inclination of the membership function of the first-half portion, as well as output of fuzzy rules, are made to correspond to weighing values for coupling in a neural network.

In the above fuzzy neural network, when the number of fuzzy rules is too small, errors in output become large. On the other hand, when the number of fuzzy rules is too high, the probability of outputting appropriate values for input other than teacher data becomes low, i.e., decreasing adaptability. Thus, it is difficult to obtain appropriate numbers of fuzzy rules which balance the adaptability and the occurrence of errors. Conventionally, the number of fuzzy rules is determined per control object through trial and error, and thus, it takes an extremely long time to obtain the appropriate number of fuzzy rules.

Further, due to changes in the object with time or changes in the surrounding conditions, the appropriate number of fuzzy rules changes accordingly. Thus, when the appropriate number of fuzzy rules is determined through trial and error, if using circumstances change frequently or changes in an object constantly occur with time, such as in the case of controlling an engine, control cannot keep up with the changes in a timely manner, i.e., timely and satisfactory control cannot be achieved.

SUMMARY OF THE INVENTION

An objective of the present invention is to solve the above problems in fuzzy neural networks, and to provide an autonomic system for constructing a fuzzy neural network which itself obtains appropriate numbers of fuzzy rules in an autonomic manner, wherein the adaptability and the occurrence of errors are balanced. Another objective of the present invention is to provide a control system using the above fuzzy neural network.

An important aspect of the present invention is to provide an autonomic system for updating a fuzzy neural network which has layers and receives as input at least two variables each having membership functions located in the layers, and which outputs a parameter to be identified or adjusted, wherein the input-output relationship is constituted using fuzzy rules formed by a combination of the membership functions, comprising the steps of: causing the fuzzy neural network to learn a relationship between input and output of the fuzzy neural network based on an error in output, by changing coupling coefficients between adjacent layers, wherein the membership functions and the fuzzy rules are modified; judging whether a change in an error in output or in coupling coefficients is within a predetermined range; if the change is not within the predetermined range, adding to the fuzzy neural network a membership function related to at least one of the at least two variables, thereby adding fuzzy rules to the fuzzy neural network; judging whether any fuzzy rules are interpolated between the other fuzzy rules or extrapolated from the other fuzzy rules; and if interpolation or extrapolation is found in a fuzzy rule, deleting the fuzzy rule. According to the above system, even if the object has strong non-linearity, fuzzy rules can be formatted in an autonomic manner.

In the autonomic system, preferably, during operation of the object, fuzzy rule(s) is/are added when an error in output cannot be controlled within a permissible range simply by updating the coupling loads (coupling coefficients) through learning. The above system allows minimizing temporal deterioration of controllability occurring due to the addition of fuzzy rules during operation of the object.

In the autonomic system, the fuzzy neural network having plural layers is normally composed of two portions: the first-half portion and the second-half portion. Preferably, linearity of coupling loads at the second-half portion of at least three membership functions in one input direction is determined, and if linearity of coupling coefficients is established, a fuzzy rule corresponding to at least one coupling load is deleted. This system allows preventing the structure from becoming unnecessarily complex by effectively deleting unnecessary fuzzy rules in an autonomic manner.

In the above autonomic system, the system can be designed to have only a deletion function, or to have only an addition function, and can be used independently, depending on the intended use of the system. The present invention includes the above aspects.

Another important aspect of the present invention is to provide a control system for controlling an object using at least one model which is obtained by modeling at least one part of the internal structures of the object, wherein the modeling is conducted using at least a fuzzy neural network which obtains appropriate numbers of fuzzy rules in an autonomic manner by adding and deleting fuzzy rules. This system allows easily and effectively controlling an object having high non-linearity since fuzzy rules can be obtained simply and efficiently, thereby efficiently modeling the object. Thus, the present invention can be applied to various types of objects. In the control system, preferably, the fuzzy neural network(s) is/are the one defined in the aforesaid autonomic system.

In the above, when the present invention is applied to engine control as described above, the fuzzy neural network constituting the engine forward model undergoes the addition and deletion of fuzzy rules in an autonomic manner, thereby obtaining an optimal number of fuzzy rules. Thus, although the engine is an object having high non-linearity, fuzzy rules can be created automatically, and the engine forward model can be constructed easily. Further, even when errors between the forward models and the actual engine caused by the environmental changes and changes in the engine over time cannot be satisfactorily fixed solely by the learning function, the forward model can be adjusted by changing fuzzy rules in the fuzzy neural network of the model, by themselves in an autonomic way, to match the models with the actual engine. Further, in the above, in the autonomic system, which comprises at least one fuzzy neural network for controlling which actually controls the object to be controlled, the system may further comprise at least one fuzzy neural network for learning which has the same structure and coupling loads as does the at least one fuzzy neural network for controlling, and the at least one fuzzy neural network for learning undergoes learning including the addition and deletion of at least one fuzzy rule, and after completion of learning, the at least one fuzzy neural network for learning is made to function as a fuzzy neural network for controlling. The above system allows minimizing temporal deterioration of controllability occurring due to the addition of fuzzy rules during operation of the object. Further, by modeling the behaviors of air and fuel using the fuzzy neural networks, the system overcomes difficulties in modeling the behaviors of air and fuel due to factors which are not easily modeled using equations, such as a volumetric efficiency and a fuel deposition rate.

BRIEF DESCRIPTION OF THE DRAWINGS

FIGS. 22a, 22b, 22c, and 22d show examples illustrating the relationship between the throttle angle and the air-fuel ratio (the throttle angle is shown in FIG. 22a) when the volumetric efficiency is not corrected (FIG. 22c), when the fuel deposition rate and the coefficient of evaporation are not corrected (FIG. 22d), and when the volumetric efficiency, the fuel deposition rate and the coefficient of evaporation are corrected due to learning (FIGS. 22b, 22c, and 22d).

DETAILED DESCRIPTION OF THE PREFERRED EMBODIMENTS OF THE INVENTION

The autonomic system for constructing a fuzzy neural network and the control system using the fuzzy neural network of the present invention will be explained with reference to an embodiment. In this embodiment, the object to be controlled is an engine installed in vehicles or vessels. However, in the autonomic system of the present invention, no restriction is imposed on the type of machine to be controlled, and as with the engine, a robot used in machine tools, a motor used in electrically-driven vehicles, or the like can be controlled by adopting the autonomic system based on the same principle as in the engine.

Engine Control System

FIGS. 1 through 21 show an engine control system using a fuzzy neural network and an autonomic system for constructing the fuzzy neural network.

Figure 1:
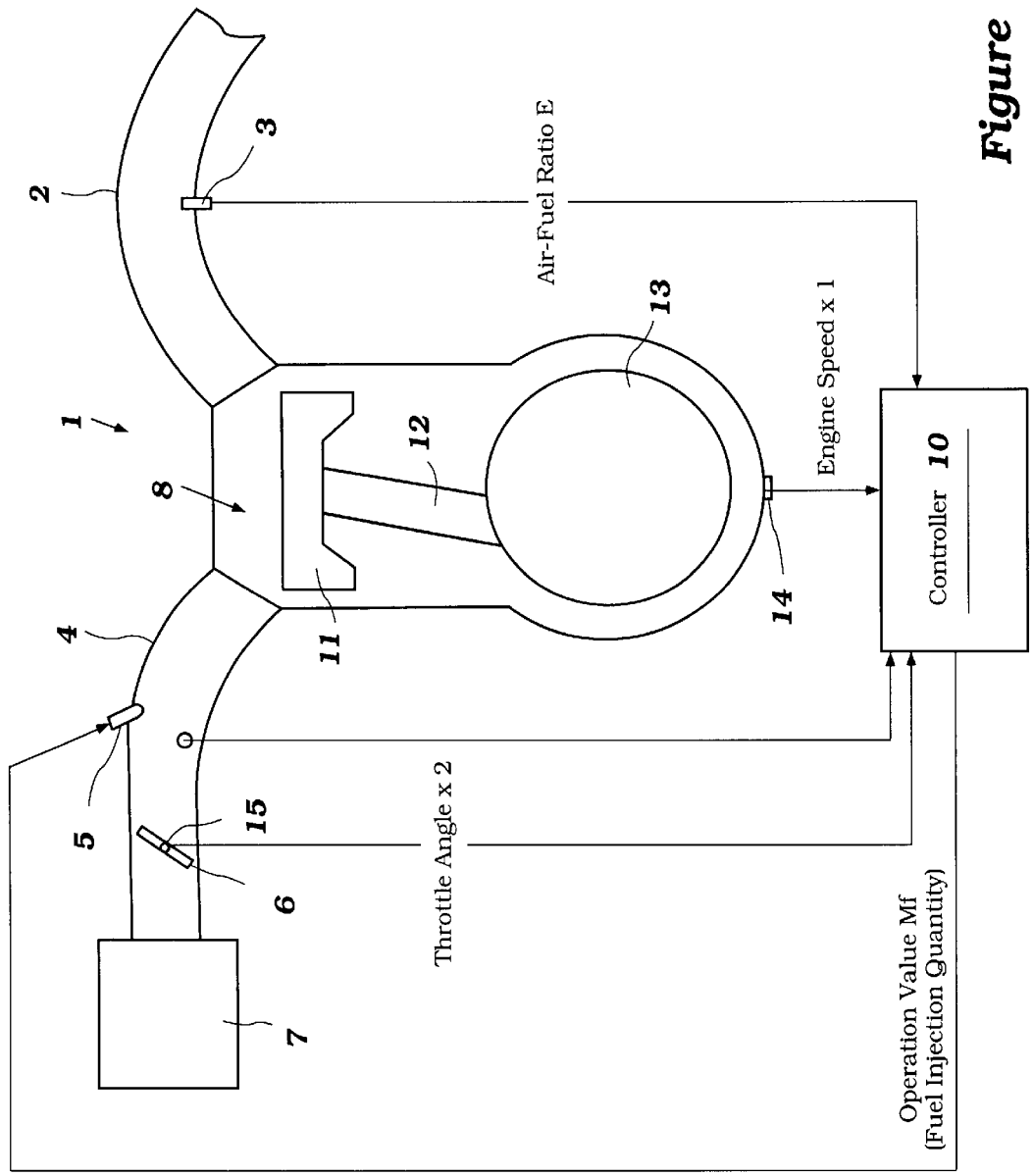
FIG. 1 shows a diagram of an engine control system installed in vehicles or vessels, wherein the relationship between an engine and a controller for operating an engine control system is illustrated, according to the present invention.

FIG. 1 shows a schematic diagram of an engine control system installed in vehicles or vessels, wherein the relationship between an engine 1 and a controller 10 for operating an engine control system is illustrated. This system is for controlling air-fuel ratio A/F of the engine 1 at a desired value.

In a cylinder 9 of the engine 1, a piston 11 is placed in a reciprocally-movable way. The piston 11 is connected to a crank shaft 13 via a connecting rod 12, and the crank shaft 13 rotates as the piston 11 reciprocates. The engine 1 is provided with a sensor 14 which transmits an engine r.p.m. (signal x1) to a controller 10. In a combustion chamber 8 formed in the cylinder 9 of the engine 1, an exhaust pipe 2 and an intake pipe 4, which are communicated to each other, are formed. In the exhaust pipe 2, an oxygen sensor 3 is provided which transmits a signal of the actual control value E (reciprocal number F/A of air-fuel ratio A/F) to the controller 10. Air is sucked into the intake pipe 4 through an air filter 7. A throttle 6 is provided in the intake pipe 4. The intake of air is controlled by the throttle 6, and the opening of the throttle 6 is sensed by a throttle-opening sensor 15 which transmits a signal of the opening (signal x2) to the controller 10. An injector 5, which injects fuel, is provided in the intake pipe 4 downstream of the throttle 6. In addition, in the intake pipe 4, a temperature sensor for sensing the intake pipe wall temperature is provided. The controller 10 receives the signal x2 of the throttle angle, the signal x1 of the engine r.p.m's., and the actual control value E, and based on the above input information, the controller 10 determines and outputs a fuel injection actuating value Mf (i.e., fuel injection quantity) to the fuel injector 5.

Figure 2:
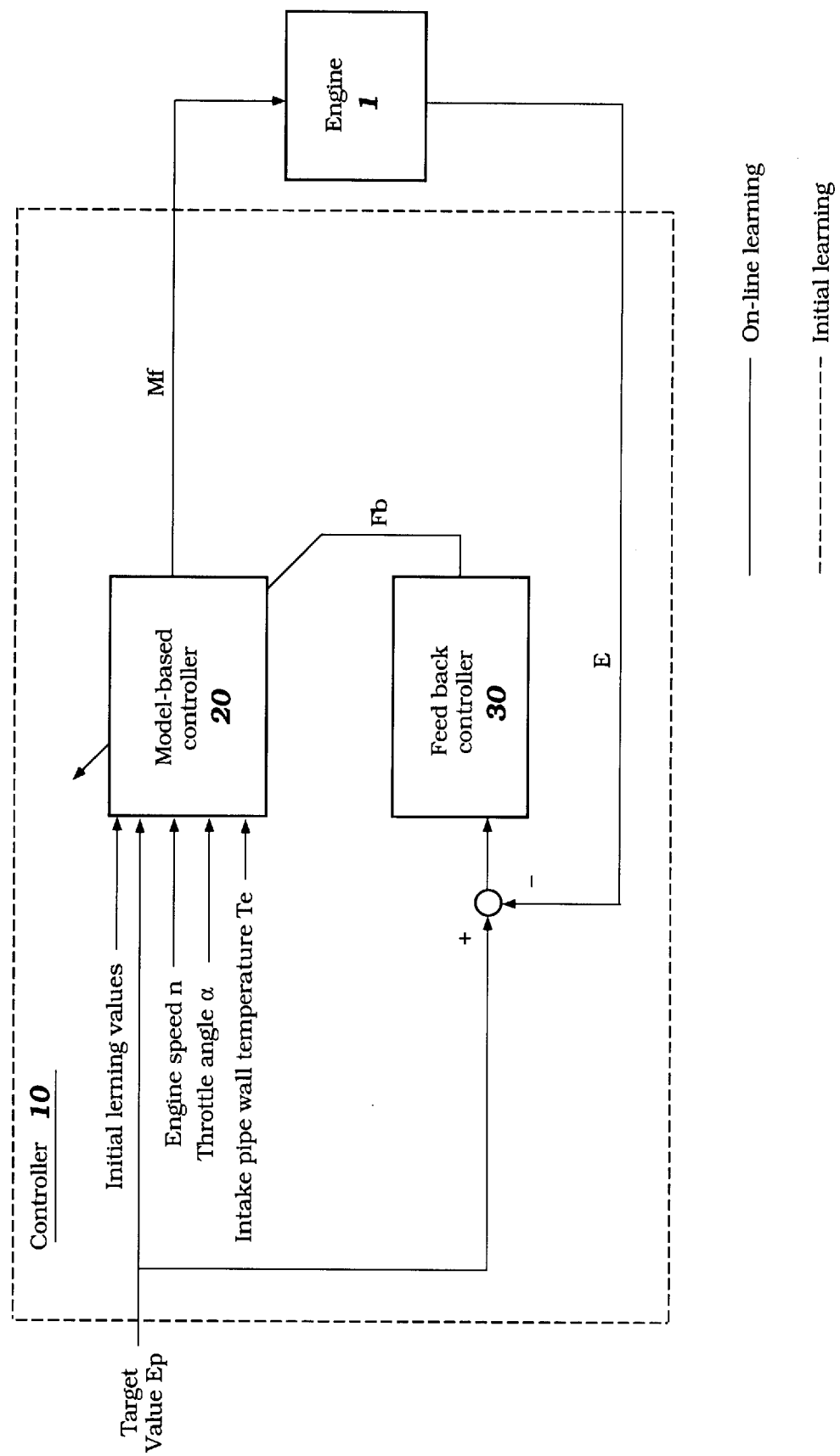
FIG. 2 shows a block diagram of control operated by the controller according to the present invention.

FIG. 2 shows a block diagram of control operated by the controller 10. The controller 10 comprises a model-based controller 20, an engine 1, and a feedback loop comprising a feedback controller 30. The model-based controller 20 determines an operation value Mf based on the information including a target control value Ep, an engine speed signal x1, a throttle angle signal x2, and an intake pipe wall temperature Te. The feedback controller 30 determines and outputs learning data Fb for teaching the internal model of the model-based controller 20, after receiving an error value determined by comparing an actual control value E and the target control value Ep.

Model-Based Controller

Hereinafter, the structures of the model-based controller 20 will be explained in detail with reference to FIG. 3.

Figure 3:
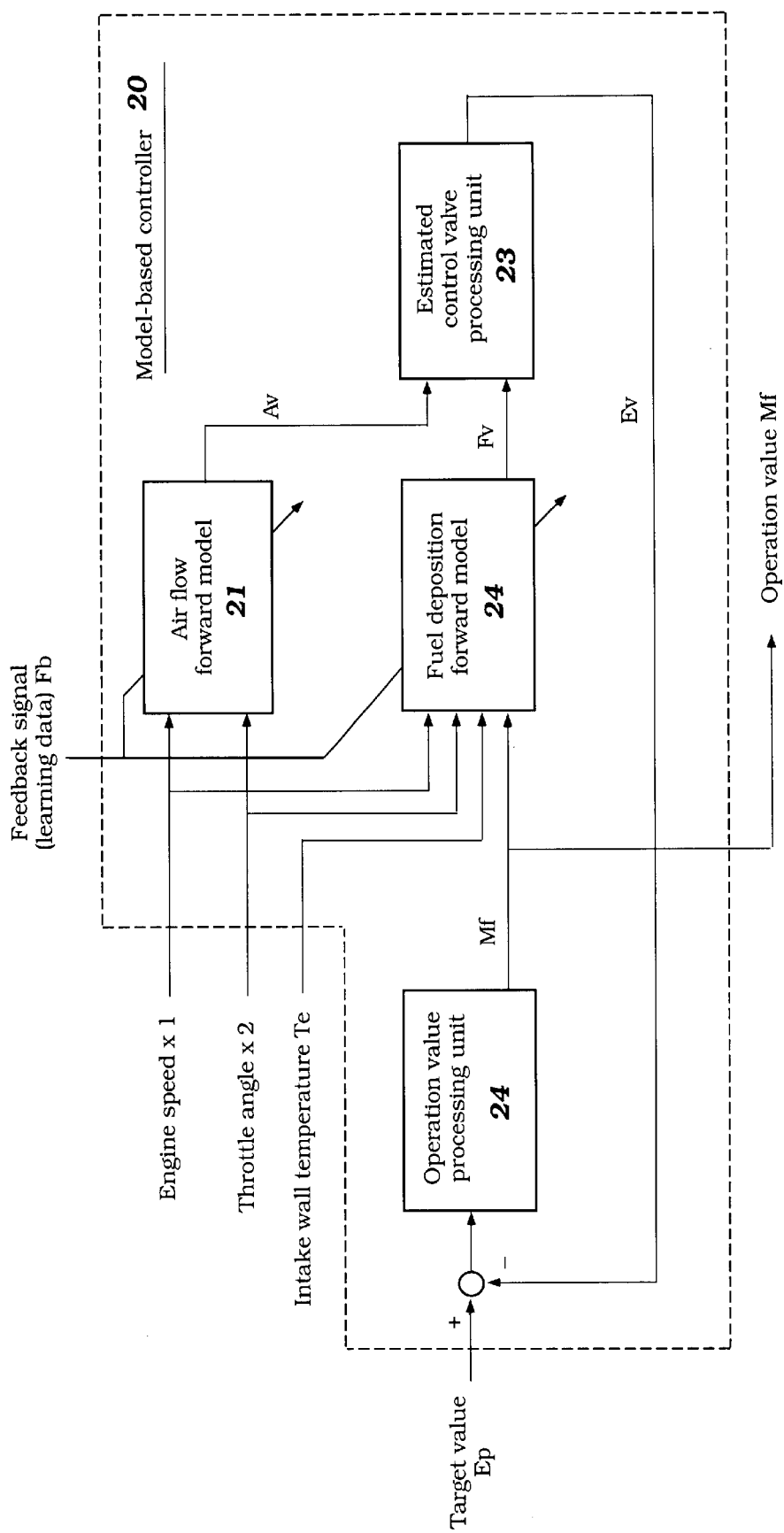
FIG. 3 is a schematic block diagram showing the structures of the model-based controller illustrated in FIG. 2.

FIG. 3 is a schematic block diagram showing the structures of the model-based controller 20 illustrated in FIG. 2. The model-based controller 20 comprises an air flow forward model 21 which is constituted by modeling air flow behavior in the intake pipe 4, a fuel deposition forward model 22 which is constituted by modeling deposition behavior of fuel injected by the fuel injector 5, and an estimated control value processing unit 23 which calculates an estimated control value Ev (reciprocal number of estimated air-fuel ratio, F/A) based on an estimated air flow Av outputted from the air flow forward model 21 and an estimated fuel quantity Fv outputted from the fuel deposition forward model 22.

In addition, the model-based controller 20 comprises a feedback loop wherein the estimated control value Ev outputted from the estimated control value processing unit 23 is fed back to an operation value processing unit 24. At the operation value processing unit 24, the estimated control value Ev and the target control value Ep are inputted to calculate the operation value Mf (fuel injection quantity) for the fuel injector 5 of the engine 1. This operation value Mf is also inputted into the fuel deposition forward model 22 while outputted from the model-based controller 20.

As described above, the model-based controller 20 is constituted by a forward model of the engine 1, which comprises the air flow forward model 21, the fuel deposition forward model 22, and the estimated control value processing unit 23, and an inverse model of the engine 1, which performs feedback of the estimated control value Ev outputted from the forward model of the engine 1, using the first feedback loop comprising the fuel deposition forward model 22, the estimated control value processing unit 23, and the basic operation value processing unit 24, thereby outputting the operation value Mf upon receiving the estimated control value Ev and the target control value Ep at the operation value processing unit 24.

In the above, in an actual engine, a feedback gain cannot be large due to the dead time or a high-order lag. However, because the fuel deposition forward model 22 is made to be composed of a simple first-order lag system, and because the air flow forward model 21 is molded by advancing the phase in accordance with the phase of the fuel deposition forward model 22, a large feedback gain can be used when conducting a feedback control over the forward model constructed in the model-based controller 20.

Air Flow Forward Model

Figure 4:
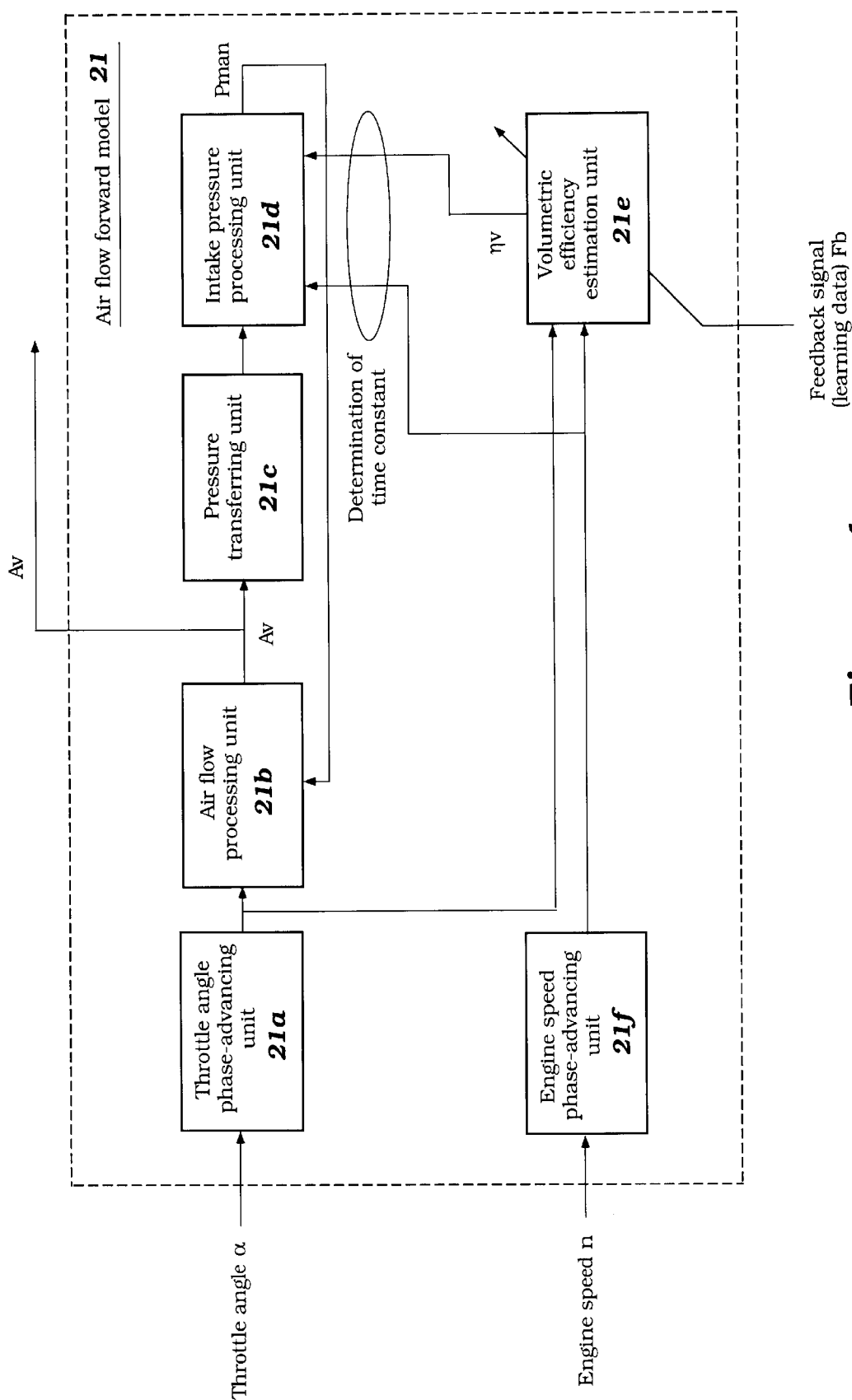
FIG. 4 is a schematic block diagram showing the structures of the air flow forward model illustrated in FIG. 3.
Figure 5:
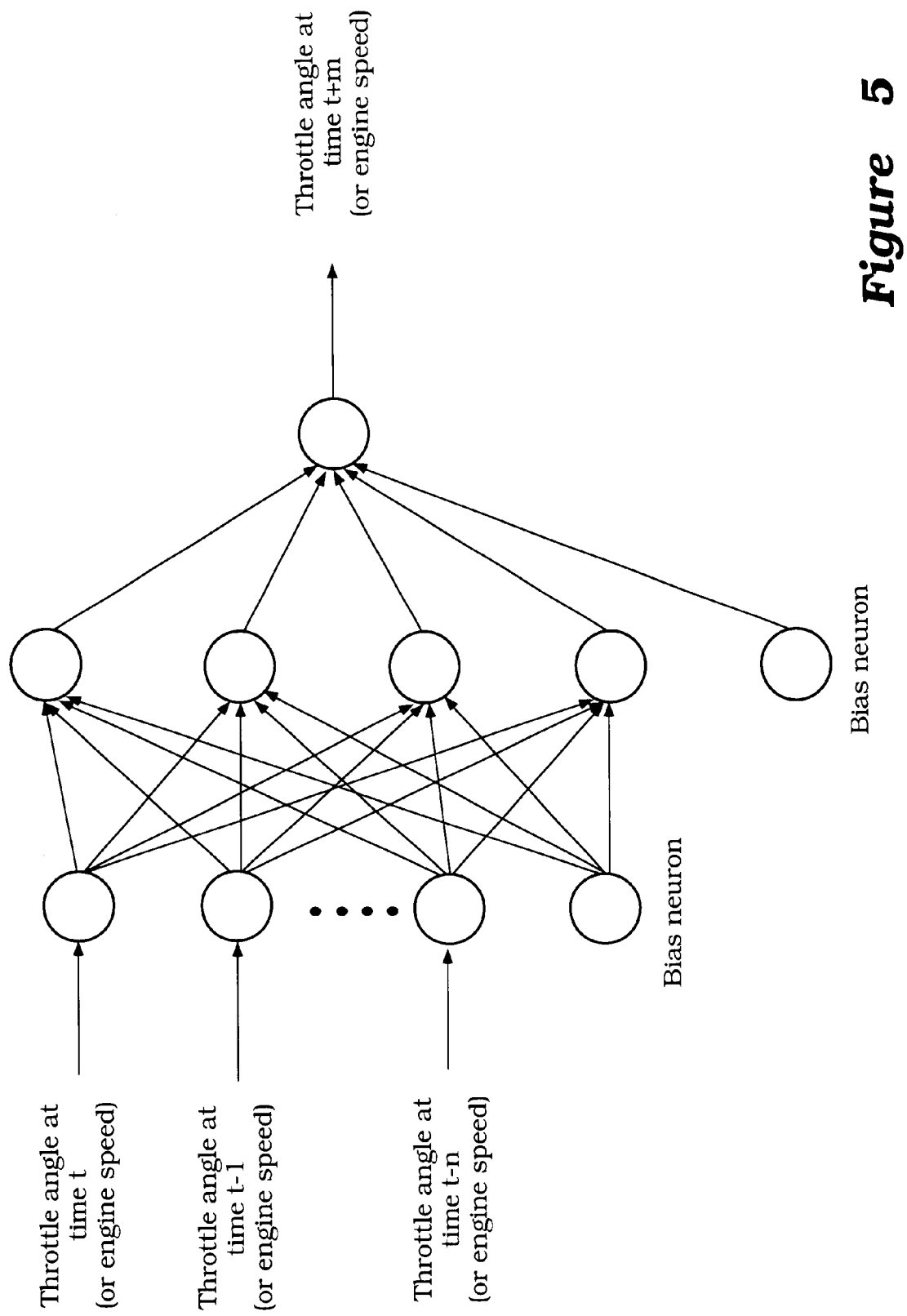
FIG. 5 is a schematic diagram of a neural network used in the phase-advance units illustrated in FIG. 4, to determine a future value of the engine speed or the throttle angle based on the engine speeds or the throttle angles at plural times in the past.

FIG. 4 is a schematic block diagram showing the structures of the air flow forward model 21.

This air flow forward model 21 is modeled by using a phase-advance unit 21a for throttle angle, an air flow processing unit 21b, a pressure transforming unit 21c, an intake pressure processing unit 21d, a volumetric efficiency processing unit 21e, and a phase-advance unit 21f for engine speed.

Phase-Advance Units

At the phase-advance unit 21a for throttle angle and the phase-advance unit 21f for engine speed, the phases of the throttle angle signal x2 and the engine speed signal n are moved forward to a degree corresponding to the dead time (i.e., the time for the injected fuel to move from the fuel injector 5 to the cylinder 8) which has been eliminated at the fuel deposition forward model 22. That is, each of the phase-advance units 21a and 21f is provided with a neural network which completes learning, changing patterns of the engine speed, or the throttle angle, in relation to time (see FIG. 5). Using this neural network, the phase is advanced by determining a future value of the engine speed and the throttle angle based on the engine speeds and the throttle angles at plural times in the past.

As described above, in the air flow forward model 21, the phases of the throttle angle and the engine speed are advanced to a degree corresponding to the dead time, meaning that the phases of the fuel deposition forward model 22 and the air flow forward model 21 are advanced to a degree corresponding to the dead time, thereby eliminating the discrepancy in the phase between the estimated fuel quantity Fv and the estimated air flow Av, which discrepancy has been created at the fuel deposition forward model 22. Thus, it is possible to estimate an appropriate estimated control value. In addition, for example, when modeling the behavior of injected fuel in an engine which causes no dead time for the injected fuel to move from the fuel injector to the cylinder or causes dead time so short that it is insignificant, such as a type of engine which injects fuel inside the cylinder, it is not necessary to use the phase-lag unit for dead time, i.e., it is not necessary to use the phase-advance units 21a and 21f.

In the above, a method of advancing the phase can be achieved not only by the neural network, but also by a method of least squares.

Because the volumetric efficiency η cannot be modeled using equations, the volumetric efficiency h is modeled using a fuzzy neural network at the volumetric efficiency estimation unit 21e, which network uses the engine speed and the intake pressure as input data.

The air flow Ma and the intake pressure Pman are modeled using fluid mechanics functions.

Fuzzy Neural Network for Volumetric Efficiency Estimation Unit

Figure 6:
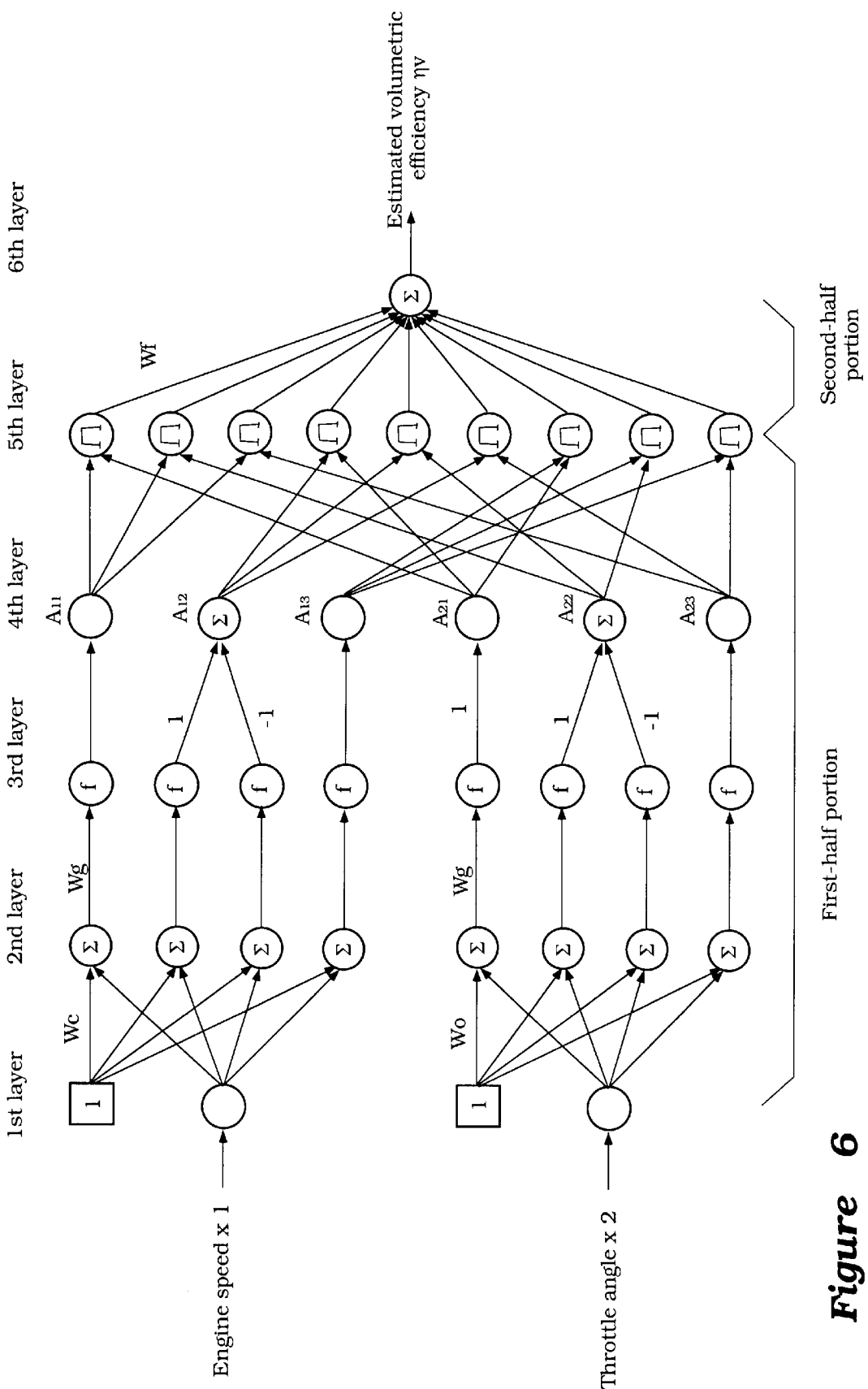
FIG. 6 is a schematic diagram showing a fuzzy neural network used in the volumetric efficiency estimation unit illustrated in FIG. 4, to determine the volumetric efficiency.

FIG. 6 is a schematic diagram showing a fuzzy neural network for determining the volumetric efficiency η, using the engine speed and the throttle angle.

As shown in this figure, the fuzzy neural network is for determining the volumetric efficiency η and comprises a hierarchical fuzzy neural network composed of six layers, wherein layers from a first layer through a fourth layer constitute a first-half portion, and layers from a fifth layer to a sixth layer constitute a second-half portion.

In this embodiment, at the first-half portion, an engine speed x1 and a throttle angle x2 each have three membership functions, i.e., A11, A12, A13, A21, A22, and A23, and input domains at the second-half portion (i.e., input at the fifth layer) are divided into 9 fuzzy rule domains (3×3=9).

In FIG. 6, "wc", "wg", "wf", "1", and "−1" indicate coupling loads between units represented by circles. The units represented by squares at the first layer indicate bias units which constantly output value 1 (one).

Each of the units at the third layer has the following sigmoid function which constitutes membership functions at the first-half portion:

$$f(x)=1/(1+\exp(-x))$$

In this network structure, to the engine speed x1 and the throttle angle x2 inputted into the respective units at the first layer, coupling load wc is added as a bias at the second layer. Input of each unit at the third layer is obtained by multiplying the corresponding output of the unit at the second layer by wg. Thus, the output of the unit at the third layer is expressed as follows:

$$f(x)=1/(1+\exp(-wg(xi+wc)))$$

In the above, xi is x1 or x2. The coupling loads wg and wc are parameters for determining the inclination and the central value of the sigmoid function. The coupling loads wg and wc are set at appropriate values for each sigmoid function, as a result of learning.

Accordingly, as output of the fourth layer, membership functions A11, A12, A13, A21, A22, and A23 can be obtained at the first-half portion, which cover certain ranges of engine speeds and throttle angles.

In the above, membership functions A11, A12, and A13 denote that the engine speed is in a "low range", "intermediate range", and "high range", respectively. Condition A21, A22, and A23 denote that the throttle opening is "small", "intermediate", and "large", respectively.

In this example, at the second-half portion, nine fuzzy rules (3×3=9) are generated, and at the fifth layer, adaptability for each fuzzy rule is calculated based on the grade of the membership functions at the first-half portion.

The fuzzy rules are determined for each combination of the membership function of the engine speed at the first-half portion and the membership function of the throttle angle at the first-half portion as follows: "if engine speed x1 is membership function A1n (n=1–3) at the first-half portion, and throttle angle x2 is membership function A2n (n=1–3), then volumetric efficiency is coupling load wf." That is, coupling load wf is a parameter which indicates output of the fuzzy rule. Coupling load wf is set at an appropriate value through learning, e.g., "when engine speed x1 is in a high range, and throttle opening x2 is intermediate, fuel deposition rate wf is 50%", or "when engine speed x1 is in a low range, and throttle opening x2 is small, fuel deposition rate wf is 70%." At the sixth layer, the sum of adaptability for each fuzzy rule at the first-half portion, which is calculated at the fifth layer, and coupling load wf, which means output of the fuzzy rule, is integrated. This integrated sum is an estimated value of volumetric efficiency ηv based on weighted means method.

The fuzzy neural network mentioned above is constituted using an autonomic system for constituting a fuzzy neural network, wherein fuzzy rules are added and deleted in an autonomic manner while learning, followed by determining an appropriate fuzzy rule.

Autonomic System for Constituting Fuzzy Neural Network

The autonomic system for constituting fuzzy neural network will be explained in detail with reference to FIGS. 7–16.

Figure 7:
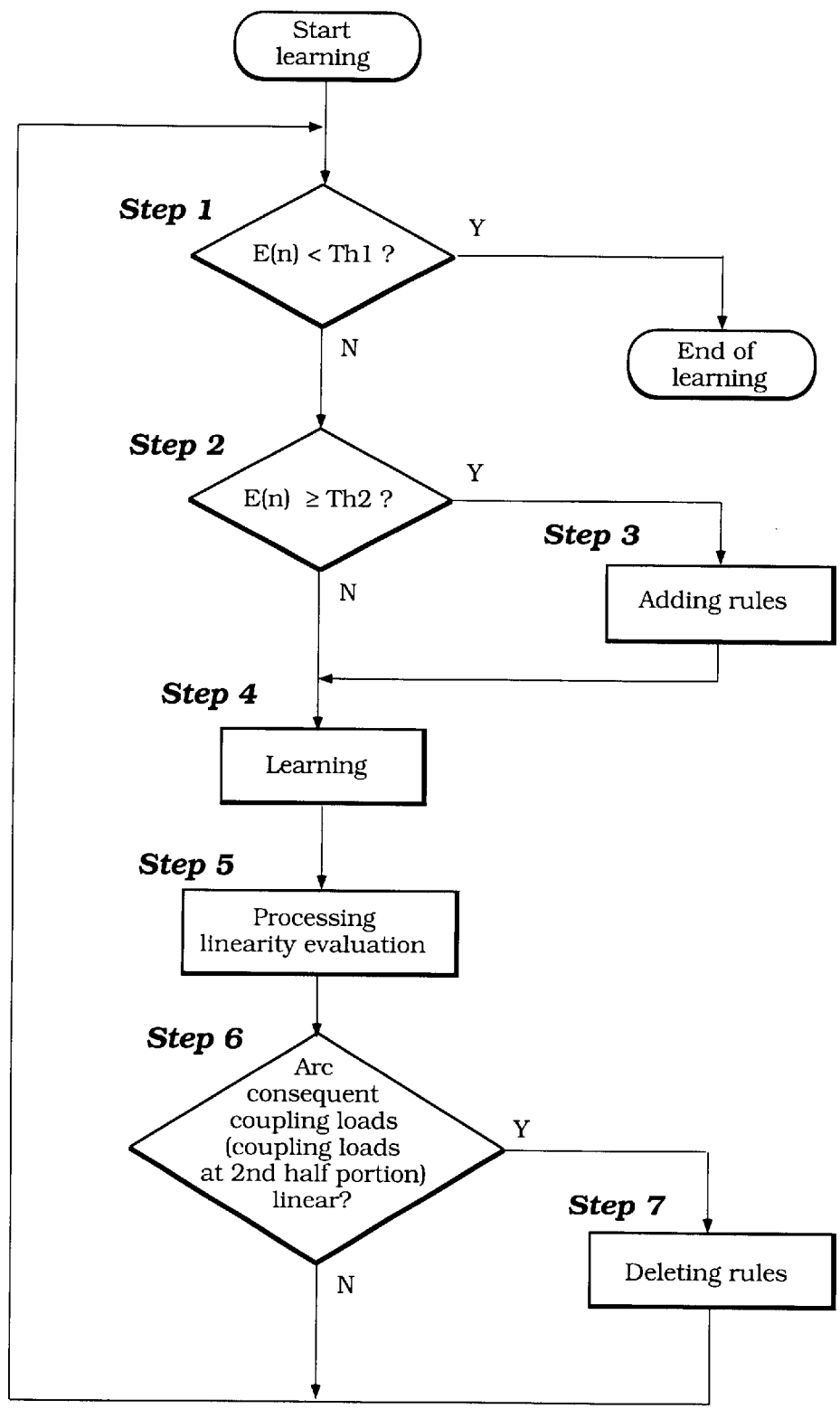
FIG. 7 is a schematic flow chart of learning processes including the addition and deletion of fuzzy rules according to the present invention.

FIG. 7 is a schematic flow chart of learning processes. The learning processes including the addition and deletion of fuzzy rules will be explained with reference to FIG. 7.

The learning processes include initial learning conducted prior to actual control over an engine using a control device, and on-line learning conducted during actual control over the engine. The learning processes start in accordance with appropriate learning-activating conditions. Learning-activating conditions may include, for example, the occurrence of starting an engine using a car key, the occurrence of changes in driving performance such as changes in throttle angle or engine speed or driving conditions, or the occurrence when the average error is larger than the appropriate threshold described later.

Upon activating learning, first, average error E(n) for all learning data after learning n times is determined, and it is judged whether average error E(n) is smaller than maximum permissible value Th1 (step 1). If average error E(n) is smaller than the maximum permissible value, learning is over. If not, learning continues. In the above, average E(n) is an absolute average of differences between output and teacher data as indicated below.

$$E(n) = \left(\sum_{j=1}^{n} |\text{output value}(j) - \text{teacher data}(j)|\right) / n$$

$$\text{Teacher data }(j) = (\text{teacher data}) / \left(\sum_{j=1}^{n} \text{maximum teacher data}(j) - \sum_{j=1}^{n} \text{minimum teacher data}(j)\right)$$

n: the number of data

In this embodiment, when conducting initial learning of the fuzzy neural network, teacher data are volumetric efficiency η obtained by experiments, and output is estimated volumetric efficiency ηv outputted from the fuzzy neural network. During on-line learning wherein control device 10 actually controls engine 1, teacher data is volumetric efficiency obtained by conducted feedback control for eliminating errors between target air-fuel ratio Ep and controlled value E. In addition, immediately after starting learning, because the number of learning is 0 (zero), the above average error is the error prior to learning. Thus, if the error is smaller than maximum permissible value Th1, learning is not required.

Figure 8:
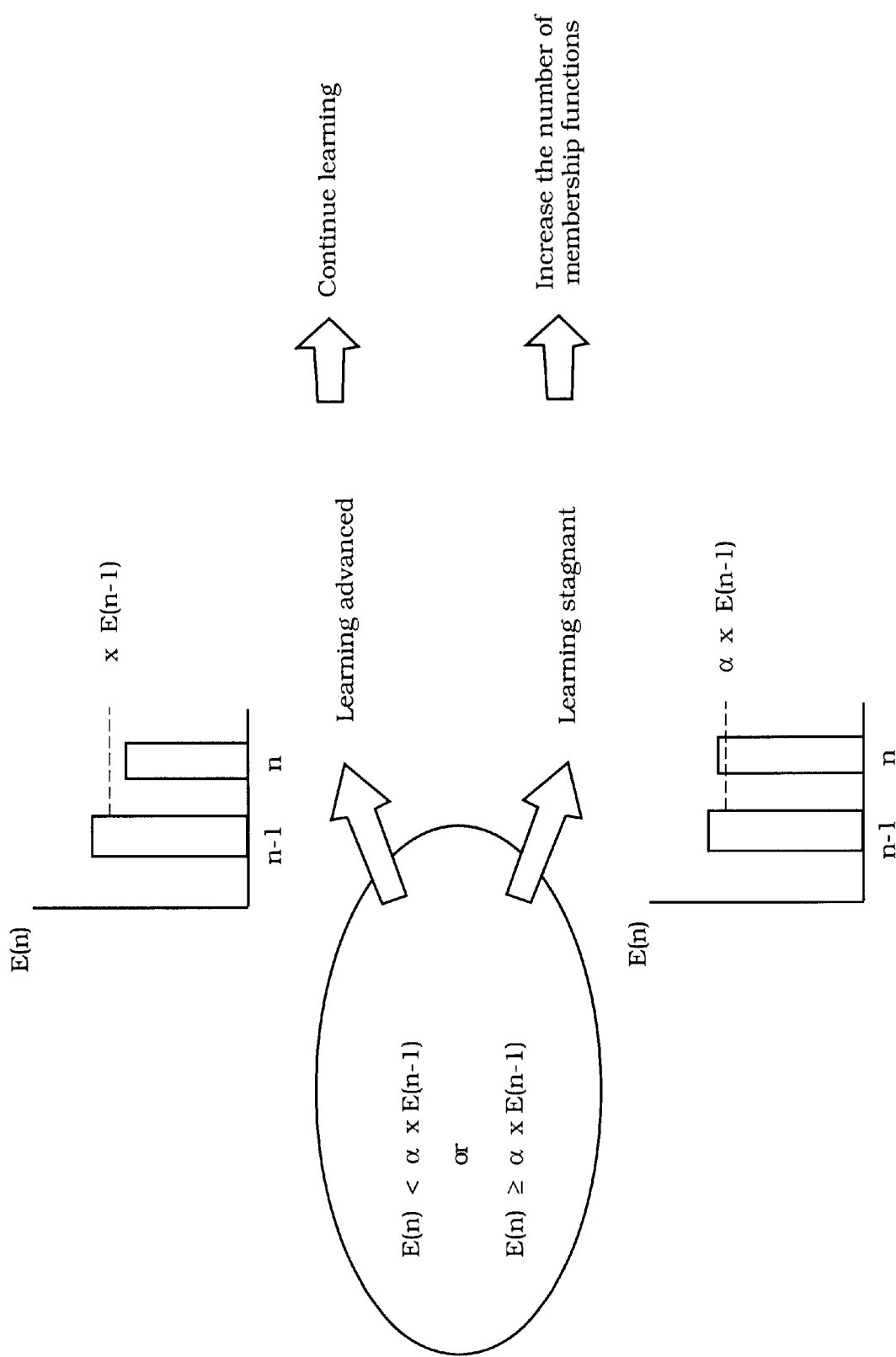
FIG. 8 is a schematic diagram showing processes in steps 2 to 4 illustrated in FIG. 7, wherein judgment is made based on average error $E(n)$ and threshold value $Th2$ ($\alpha E(n-1)$).

It is judged next whether average error E(n) after learning n times is larger than threshold value Th2 (step 2). Threshold value Th2 is a value obtained by multiplying average error E(n−1) after learning n−1 times by coefficient a (a<1: e.g., 0.99). If average error E(n) is larger than threshold value Th2, learning is judged to be stagnant, and the addition of rules is conducted in step 3. If average error E(n) is smaller than threshold value Th2, learning is judged to be advanced, and learning process in step 4 is conducted (FIG. 8).

Addition Process of Fuzzy Rules

Figure 9:
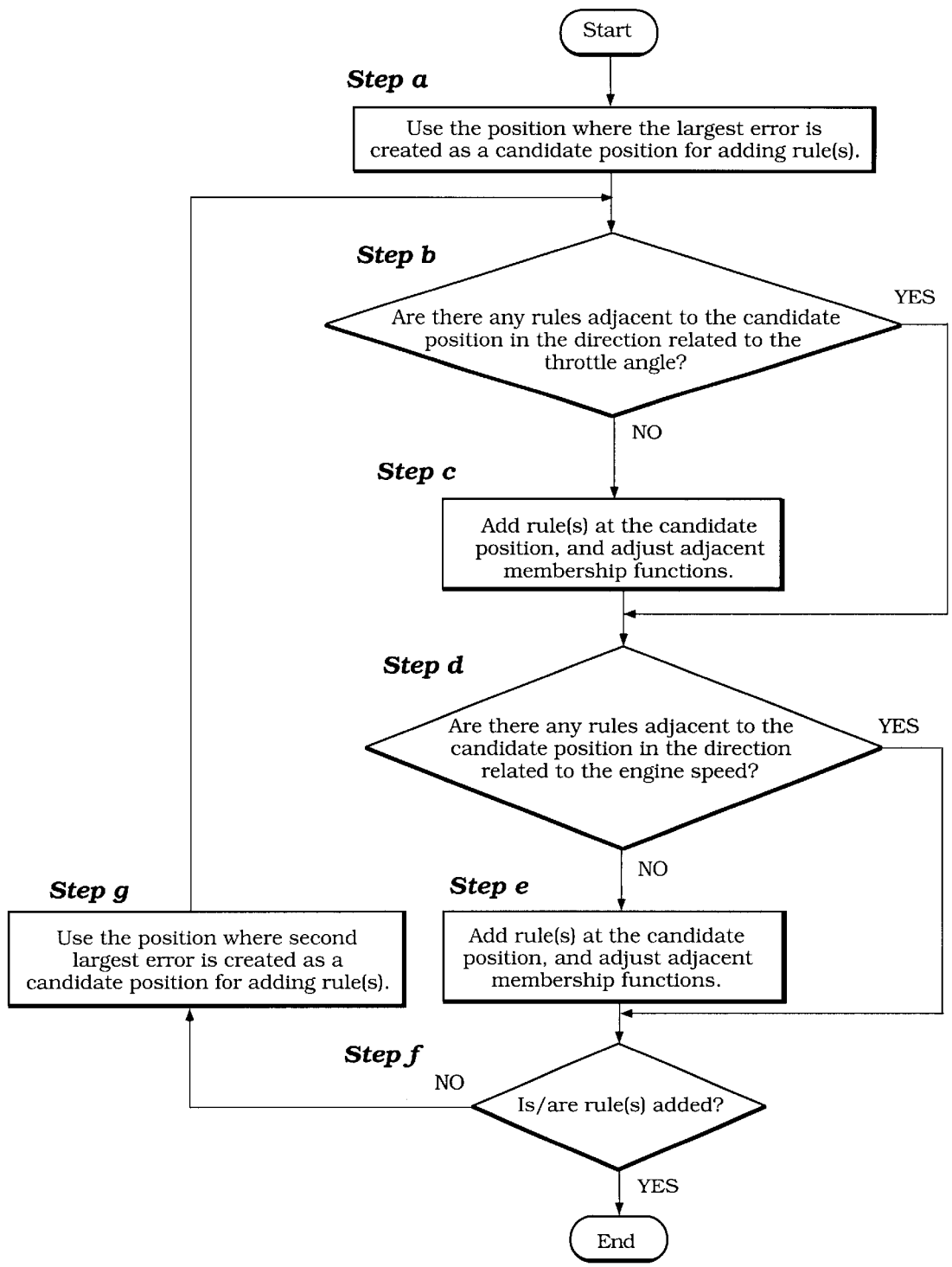
FIG. 9 is a schematic flow chart of subroutines for the addition of fuzzy rules in step 3 illustrated in FIG. 7.
Figure 10:
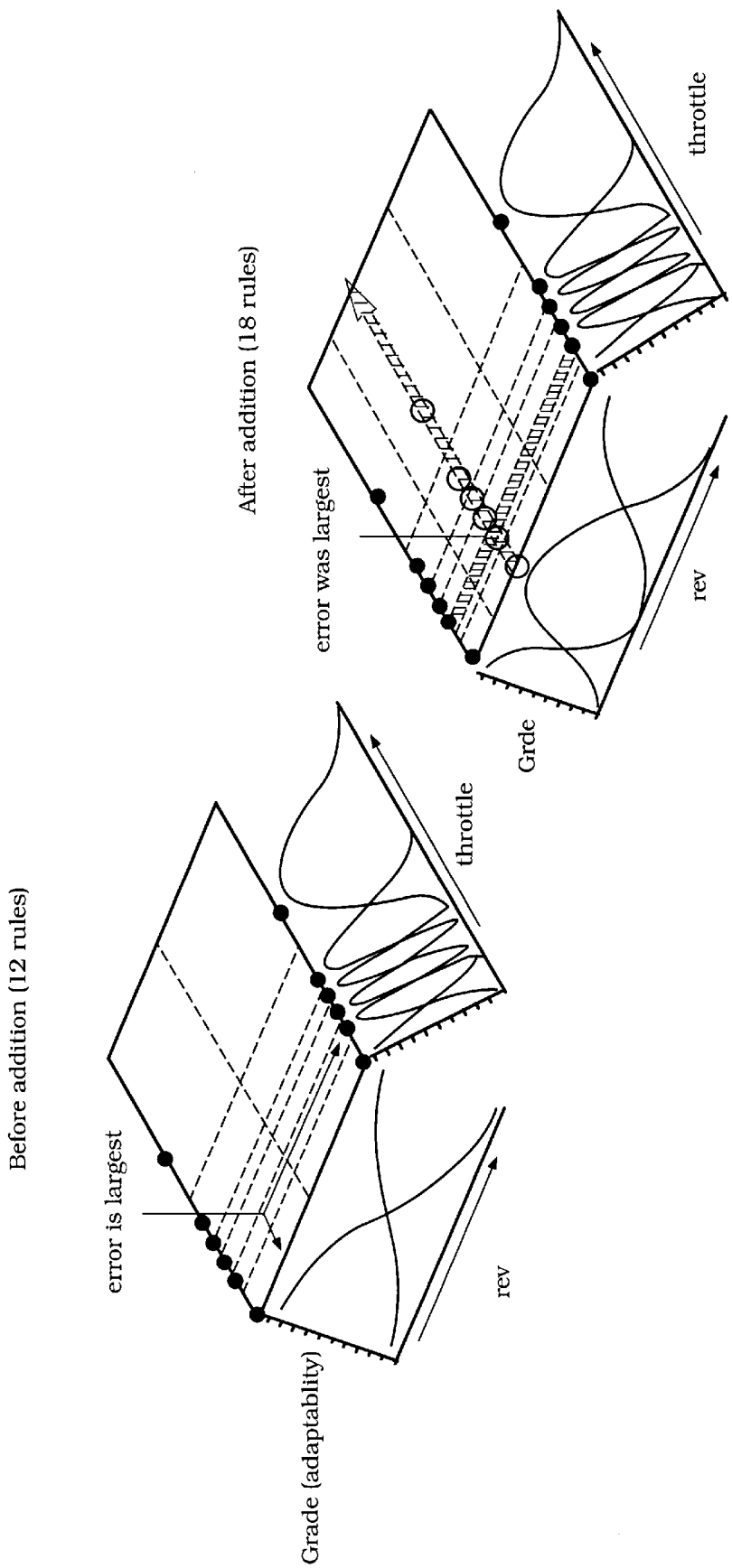
FIG. 10 is a schematic view showing the relationship between the membership functions and the fuzzy rules of the fuzzy neural network before adding rules and after adding rules, wherein the engine speed and the throttle angle are used as input.
Figure 11:
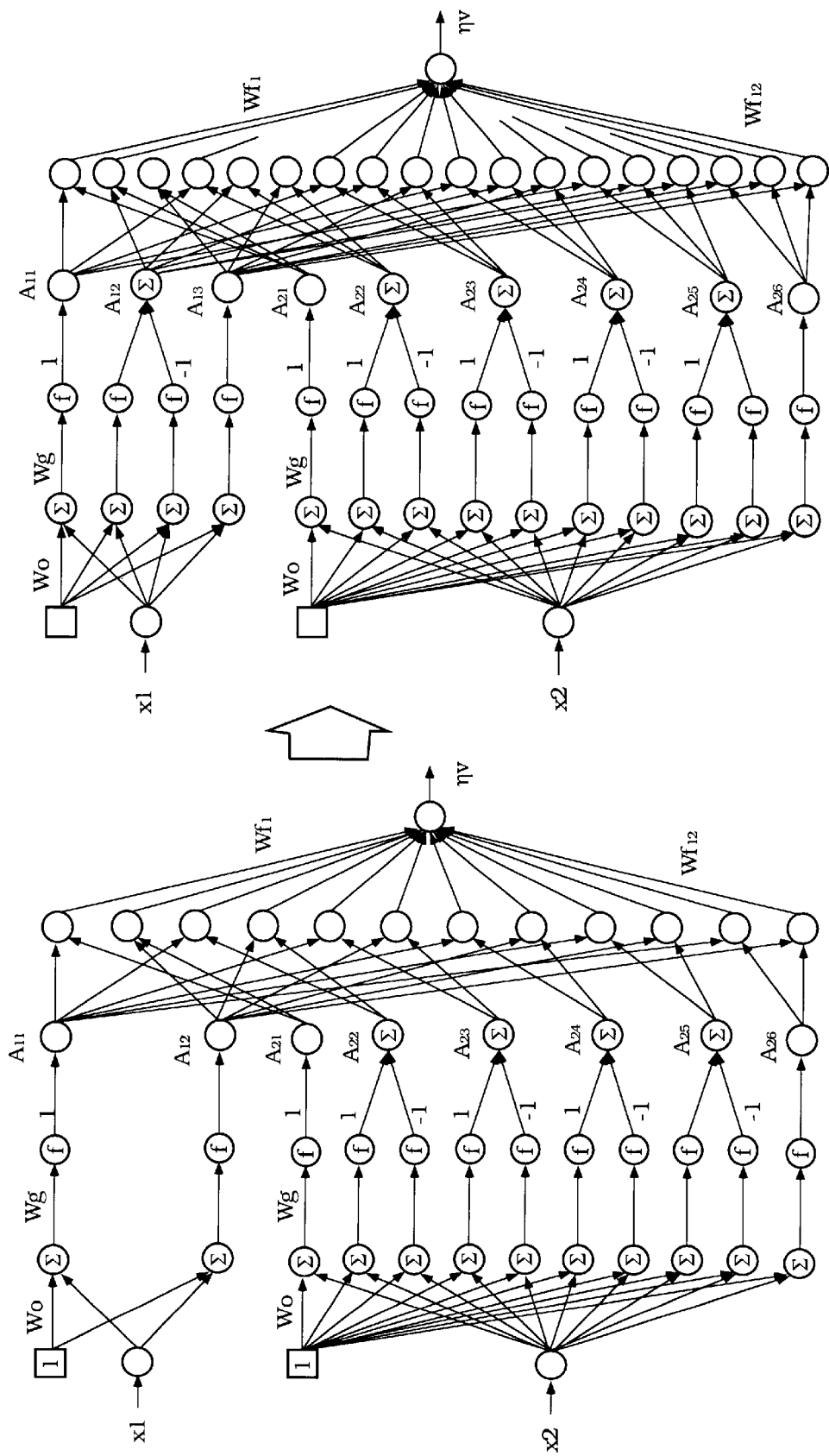
FIG. 11 is a schematic diagram showing fuzzy neural networks corresponding to FIG. 10.

FIG. 9 is a schematic flow chart of subroutines for the addition of fuzzy rules in step 3, and FIG. 10 is a schematic view showing the relationship between the membership functions and the fuzzy rules of the fuzzy neural network before adding rules and after adding rules, wherein the engine speed and the throttle angle are used as input. FIG. 11 is a schematic diagram showing fuzzy neural networks corresponding to FIG. 10. In this fuzzy neural network, engine speed x1 possesses two membership functions A11 and A12, and throttle angle x2 possesses six membership functions A21 through A26, and there are twelve fuzzy rules (outputs wf1 through wf12). By adding one membership function of engine speed x1, the number of fuzzy rules becomes 18 (outputs wf1 through wf18).

In the learning process, if learning is judged to be stagnant (step 2), this addition process is activated.

Upon activation of the addition step, first, an input value which maximizes an error (engine speed x1n, throttle angle x2n) is determined, and the position of the input value is used as a candidate position for adding rules (step a).

It is next determined whether there is a membership function having a peak adjacent to an input value (throttle angle x2n) corresponding to the candidate position by checking an adjacent area of the candidate position in one input direction, e.g., in the direction related to the throttle angle (step b). If there is no such membership function, a new membership function is added in the input direction (i.e., the direction related to the throttle angle), and coupling coefficients wc and wg related to the center positions and the inclinations of the other membership functions in the input direction are adjusted (step c). If there is a membership function having a peak adjacent to an input value corresponding to the candidate position in step b, no new membership function is added, and step d is implemented.

Initial values of coupling coefficients wc, wg, and wf of membership functions to be added are temporarily set at appropriate values, and adjusted by learning. For example, the candidate position is considered to be a peak, and an initial value of central value wc is set at an intermediate value between the peak of the candidate position and the peak of the adjacent membership function. An initial value of inclination wg is set at a value which allows smooth connection of the peak and central value wc. An initial value of output wf of fuzzy rule is set at a value of teacher data if teacher data are found upon determining whether teacher data exist in a segment corresponding to a candidate position of additional rules where an input domain is divided into several segments. If no teacher data is found, an initial value of output wf is set at a value obtained by linear interpolation of output wf of an adjacent fuzzy rule.

In the embodiment in FIG. 10, because a membership function, which has a peak in the vicinity of an input value corresponding to a candidate position, already exists in the direction related to the throttle angle, no new membership function is added in the direction related to the throttle angle.

In steps d and e, the same process as in steps b and c is conducted in another input direction, e.g., in the direction related to the engine speed.

In FIG. 10, because no membership function, which has a peak in the vicinity of an input value corresponding to a candidate position, exists in the direction related to the engine speed (step d), a new membership function is added, whereby the number of membership functions of engine speed x1 ultimately increases from two to three, and the number of fuzzy rules increases from 12 types (2×6=12) to 18 types (3×6=18).

After completion of the above process at a candidate position of an additional rule in all directions (here, the directions related to the throttle angle and changing the engine speed), it is determined in step f whether a fuzzy rule is added. If a fuzzy rule is added, the process of adding a fuzzy rule is complete, and a learning process newly starts. If a membership function exists at a candidate position of an additional rule in all directions, and no fuzzy rule is added, a position where an error is large is then used as a candidate position (step g), followed by steps b through e.

In FIG. 10, after new membership functions are added in the direction related to the engine speed, and fuzzy rules are also added, the addition process is complete. In the above, the addition process is repeated until a membership function is newly added.

The addition process can be repeated until a fuzzy rule is newly added as indicated in FIG. 9, or can be completed after repeating steps b through e at given times regardless of whether a new fuzzy rule is added or not.

Learning Process

To explain the learning process, FIG. 7 will be referred to. In step 2, if average error E(n) is smaller than threshold Th2, learning is judged to be advanced, and step 4 of learning is implemented.

In the learning in step 4, fuzzy neural networks undergo learning using a back provocation method. Through this step, a central value and inclination of each membership function, and coupling coefficients wc, wg, and wf corresponding to output values of fuzzy rules are updated.

In practice, at initial learning, this learning is conducted by adjusting each of coupling coefficients wc, wg, and wf in such a way that the difference between the volumetric efficiency obtained by experiments and the estimated volumetric efficient $\eta v$ is decreased. During on-line learning, based on the relationship between volumetric efficiency $\eta$ and control value E, "when volumetric efficiency $\eta$ increases, actual control value E (F/A) increases," each of coupling coefficients wc, wg, and wf is adjusted to reduce an error between actual control value E and target control value Ep.

Deletion Process of Fuzzy Rules

After the learning process in step 4, linearity is evaluated in step 5.

Figure 12:
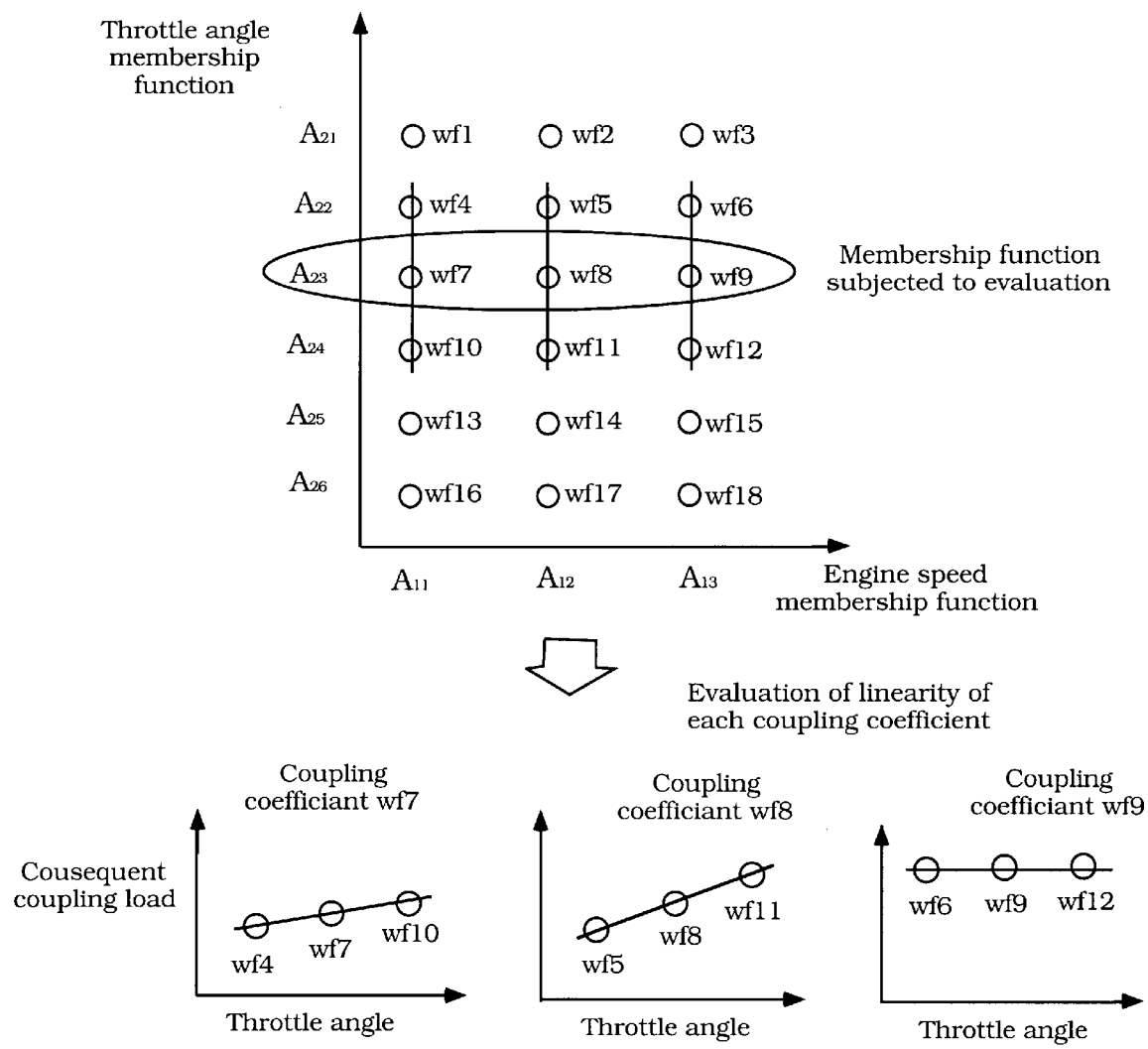
FIG. 12 is a schematic diagram showing the linearity evaluation process which is conducted to evaluate whether the relationship, between coupling coefficient wf of a membership function to be evaluated and coupling coefficient wf at the second-half portions of at least two other membership functions in the same direction as the membership function to be evaluated, is linear for all fuzzy rules related to the membership function to be evaluated, i.e., for all coupling load wf at the second-half portion.
Figure 13:
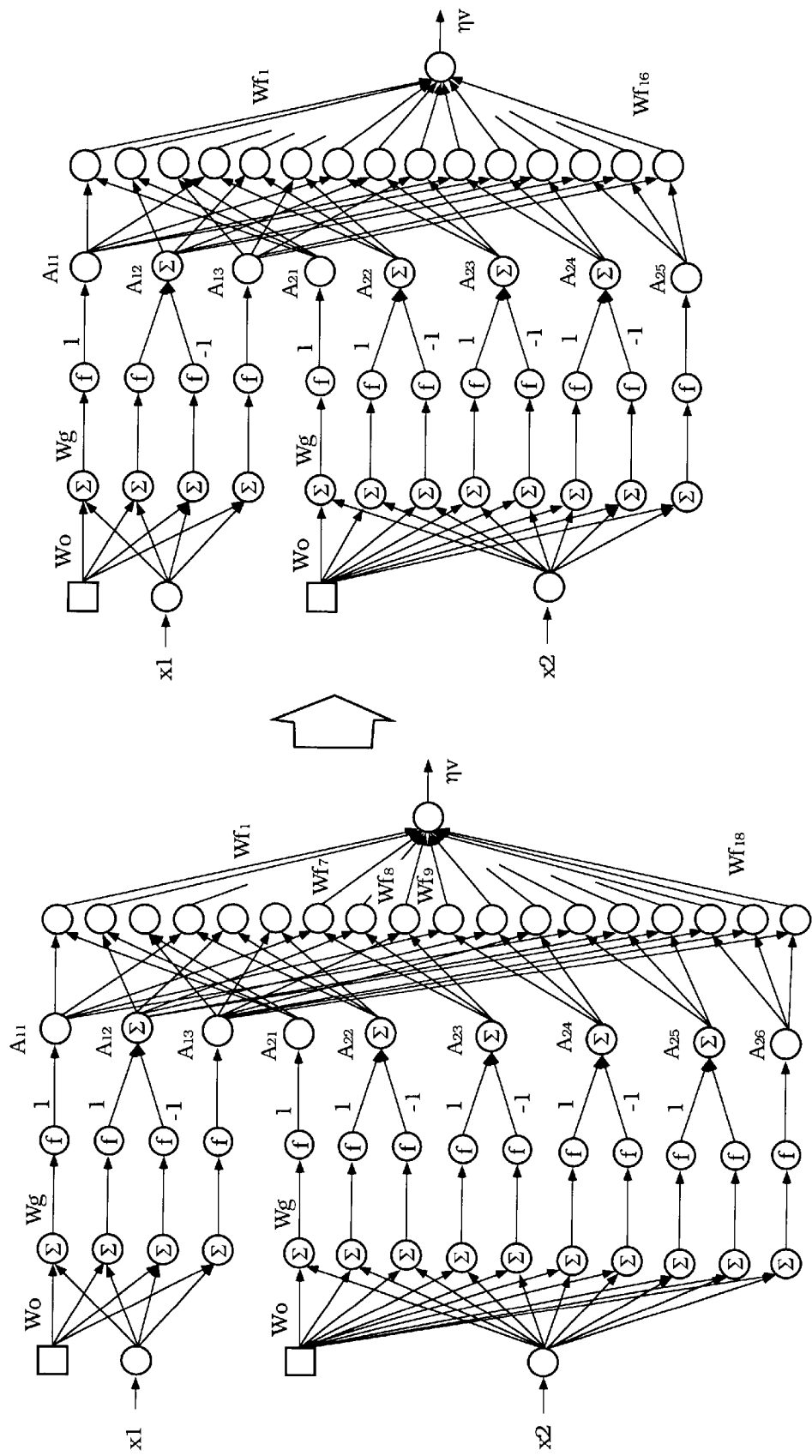
FIG. 13 is a schematic diagram showing neural networks corresponding to the process shown in FIG. 12.

As indicated in FIGS. 12 and 13, this linearity evaluation process is conducted to evaluate whether the relationship, between coupling coefficient wf of a membership function to be evaluated and coupling coefficient wf at the second-half portions of at least two other membership functions in the same direction as the membership function to be evaluated, is linear for all fuzzy rules related to the membership function to be evaluated, i.e., for all coupling load wf at the second-half portion. As a result, if the relationship, between all of the coupling load wf at the second-half portion related to the membership function to be evaluated and coupling coefficient wf at the second-half portions of at least two other membership functions in the same direction as the membership function to be evaluated, is linear, the membership function to be evaluated is judged to be compensated for by other membership functions in the same direction having linear relationship with the coupling coefficient wf at the second-half portion (step 6), followed by deleting the membership function (step 7). As a result, all fuzzy rules related to the membership function (coupling coefficient wf at the second-half portion) are also deleted.

Figure 14:
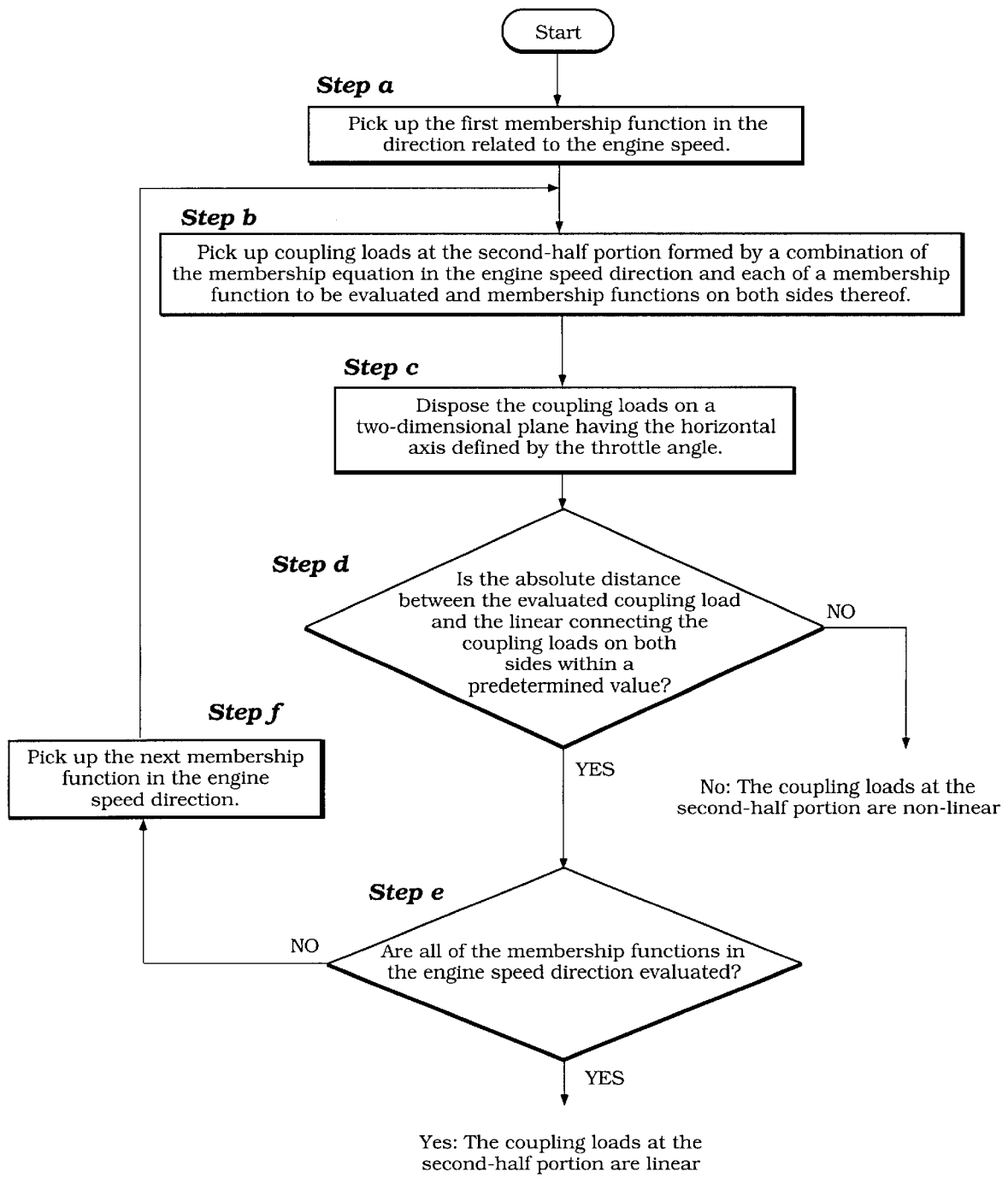
FIG. 14 shows a flow chart of the linearity evaluation process in step 5 illustrated in FIG. 7.

FIG. 14 shows a flow chart of the linearity evaluation process in step 5.

The linearity evaluation process is explained with reference to FIG. 14. For example, one membership function in the direction related to the throttle angle is selected to be an object to be evaluated (A23 in FIG. 12), and the first membership function in the direction related to the engine speed is picked up (A11 in FIG. 12) (step A). Coupling loads at the second-half portion (wf7, wf4, wf10), which are obtained by combining the picked membership function in the direction related to the engine speed (A11) and the membership functions of the object to be evaluated and of both sides thereof in the direction related to the throttle angle (A23, A22, A24), are then picked up (step B).

The picked coupling coefficients at the second-half portion (wf7, wf4, wf10) are then disposed on a two-dimensional plane having the horizontal axis defined by the throttle angle, and the vertical axis defined by the coupling coefficients at the second-half portion (step C).

It is determined whether the absolute distance between the line connecting the coupling coefficients on both sides at the second-half portion (wf4, wf10) and the coupling coefficient in the center at the second-half portion (wf7) is no higher than a predetermined value (e.g., 0.03). In practice, the value obtained by linear interpolation of the coupling coefficients (wf4, wf10) on both sides and the coupling coefficient (wf7) of the object to be evaluated are compared, and it is determined whether the difference obtained by the comparison is within a predetermined value (step D). In the above, the value obtained by linear interpolation of the coupling coefficients (wf4, wf10) on both sides and the coupling coefficient (wf7) of the object to be evaluated are normalized in such a way that the difference between the maximum value and the minimum value of teacher data is set at 1 (one).

As a result of the judgment in step D, if the difference between the value obtained by linear interpolation of the coupling coefficients on both sides at the second-half portion and the coupling coefficient of the object to be evaluated at the second-half portion exceeds a predetermined value, and the coupling coefficients on both sides (wf4, wf10) and the coupling coefficient of the object to be evaluated (wf7) are judged to be non-linear. If all of the membership functions in the direction related to the engine speed are not evaluated with respect to the membership function of the object to be evaluated (A23) (step E), the next membership function in the direction related to the engine speed (A12) is picked up (step F), and steps B through D are repeated.

In the above, the evaluation of the membership function of the object is conducted for all of the membership functions which can be combined therewith (A11, A12, A13 in FIG. 12). If linearity is established for all of the coupling coefficients wf7, wf8, and wf9, the membership function at the second-half portion is judged to be linear, and learning step 6 in FIG. 7 is implemented.

The linearity evaluation process can be conducted continuously for all of the membership functions, or predetermined numbers of membership functions can simply be subjected to the process.

Referring back to the flow chart of the learning processes in FIG. 7, it is determined in step 6 whether the coupling coefficient at the second-half portion possesses any linear membership functions based on the results of linearity evaluation in step 5. If no linear membership function exists, the process is returned to step 1. If any linear membership functions exist, the membership functions are deleted in step 7, and the shapes of the membership functions adjacent to the deleted membership function are adjusted. Along with the deletion of the membership function, the fuzzy rules associated with the deleted membership function are deleted. After deletion of the membership function (i.e., fuzzy rules), step 1 is resumed.

Figure 15:
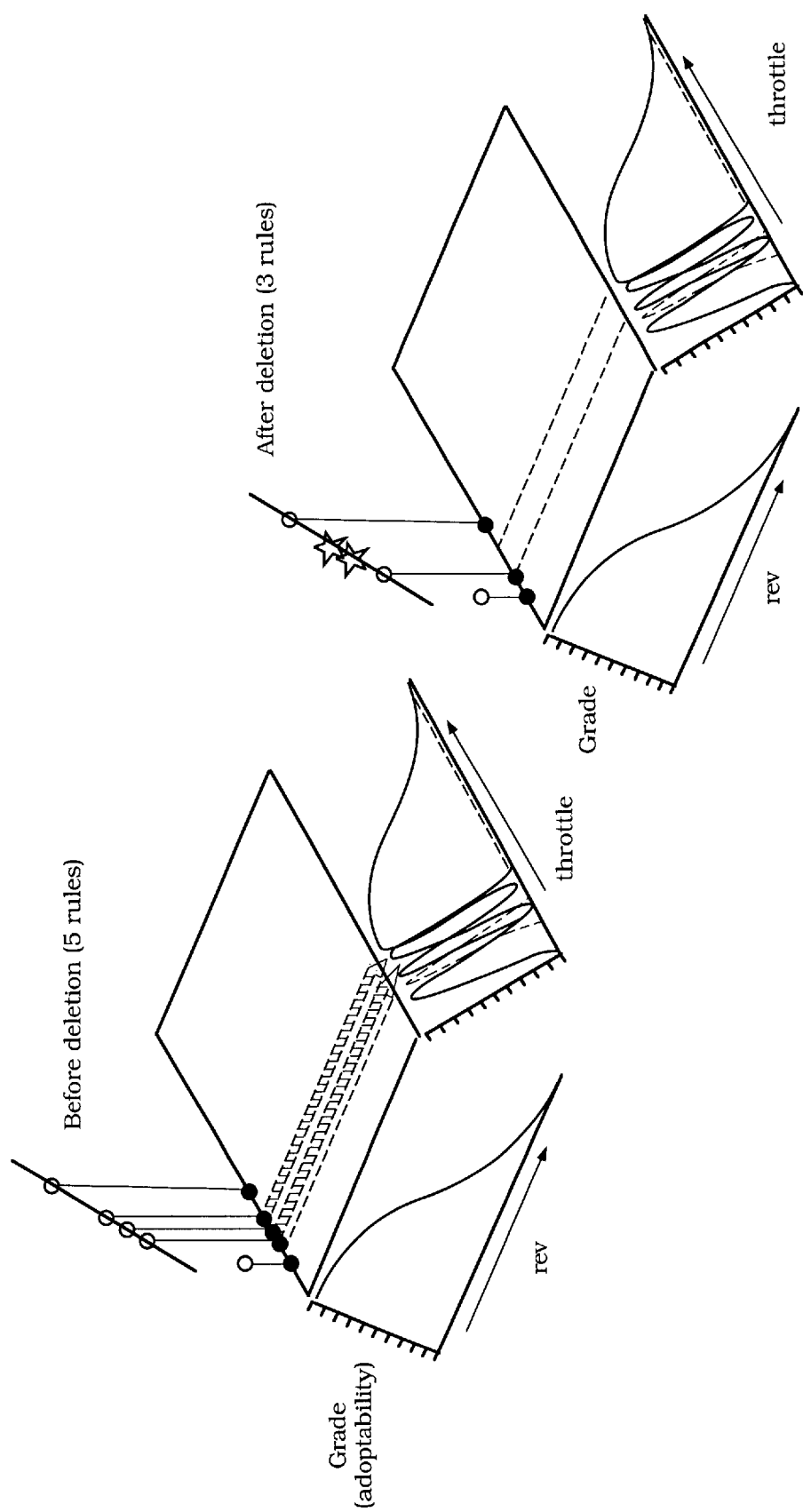
FIG. 15 is a schematic view showing the relationship between the membership functions and the fuzzy rules before and after deletion.
Figure 16:
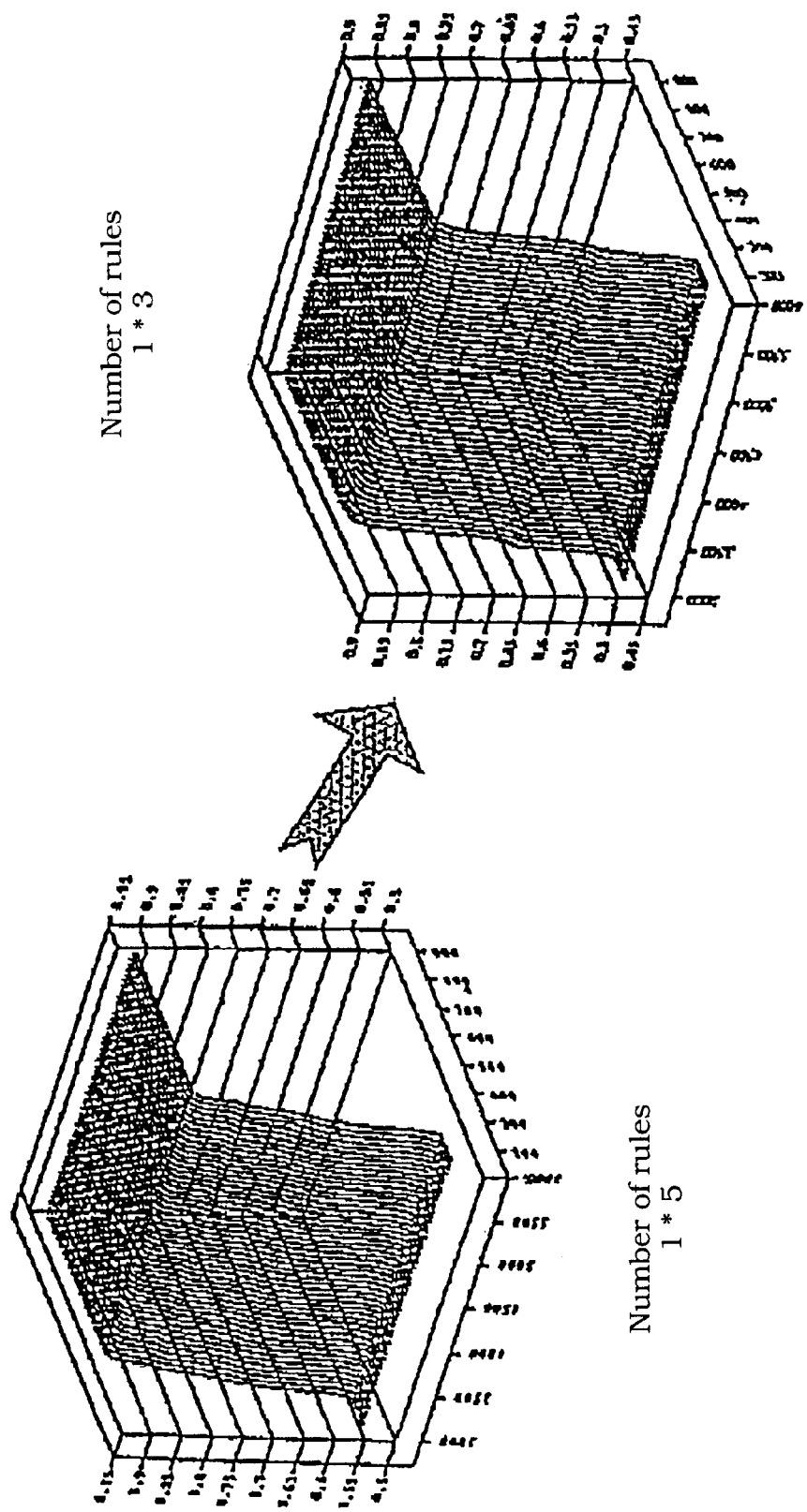
FIG. 16 is a schematic view showing the relationship between the input and output of the fuzzy neural network before and after deletion.

FIGS. 15 and 16 show an example wherein the number of fuzzy rules decreases from five to three by deleting two membership functions in the direction related to the throttle angle. In the above, the engine speed and the throttle angle are inputted, the volumetric efficiency is outputted, there is one membership function in the direction related to the engine speed, there are five membership functions in the direction related to the throttle angle, the fuzzy neural network has five fuzzy rules, and the fuzzy rule deletion process based on the aforesaid linearity evaluation process is applied to the fuzzy neural network. FIG. 15 is a schematic view showing the relationship between the membership functions and the fuzzy rules before and after deletion. FIG. 16 is a schematic view showing the relationship between the input and output of the fuzzy neural network before and after deletion. As shown in FIGS. 15 and 16, the output shape of the fuzzy neural network remains the same after deletion of fuzzy rules based on the aforesaid linearity evaluation process, i.e., it is understood that through the linearity evaluation process, membership functions which are not necessary to conduct appropriate control are deleted with high accuracy and certainty.

Example of Addition and Deletion of Fuzzy Rules

The learning including the addition and the deletion of the fuzzy rules described above is repeated until the conditions for termination of learning in step 1 are satisfied.

As explained above, during learning, when errors in output cannot be controlled within a predetermined level simply by learning, errors in output can effectively and efficiently be reduced by adding new fuzzy rules to the position(s) where the additional fuzzy rules are most required. Further, by checking whether there are fuzzy rules which can be deleted during learning, if there are deletable fuzzy rules, unnecessary fuzzy rules can easily and effectively be deleted, thereby preventing deterioration of adaptability due to an intensive increase in the number of fuzzy rules. As a result, by using the above system, it is possible for the fuzzy neural network itself to obtain the optimum numbers of fuzzy rules in an autonomic manner, thereby balancing the adaptability and the occurrence of errors in output.

Figure 17:
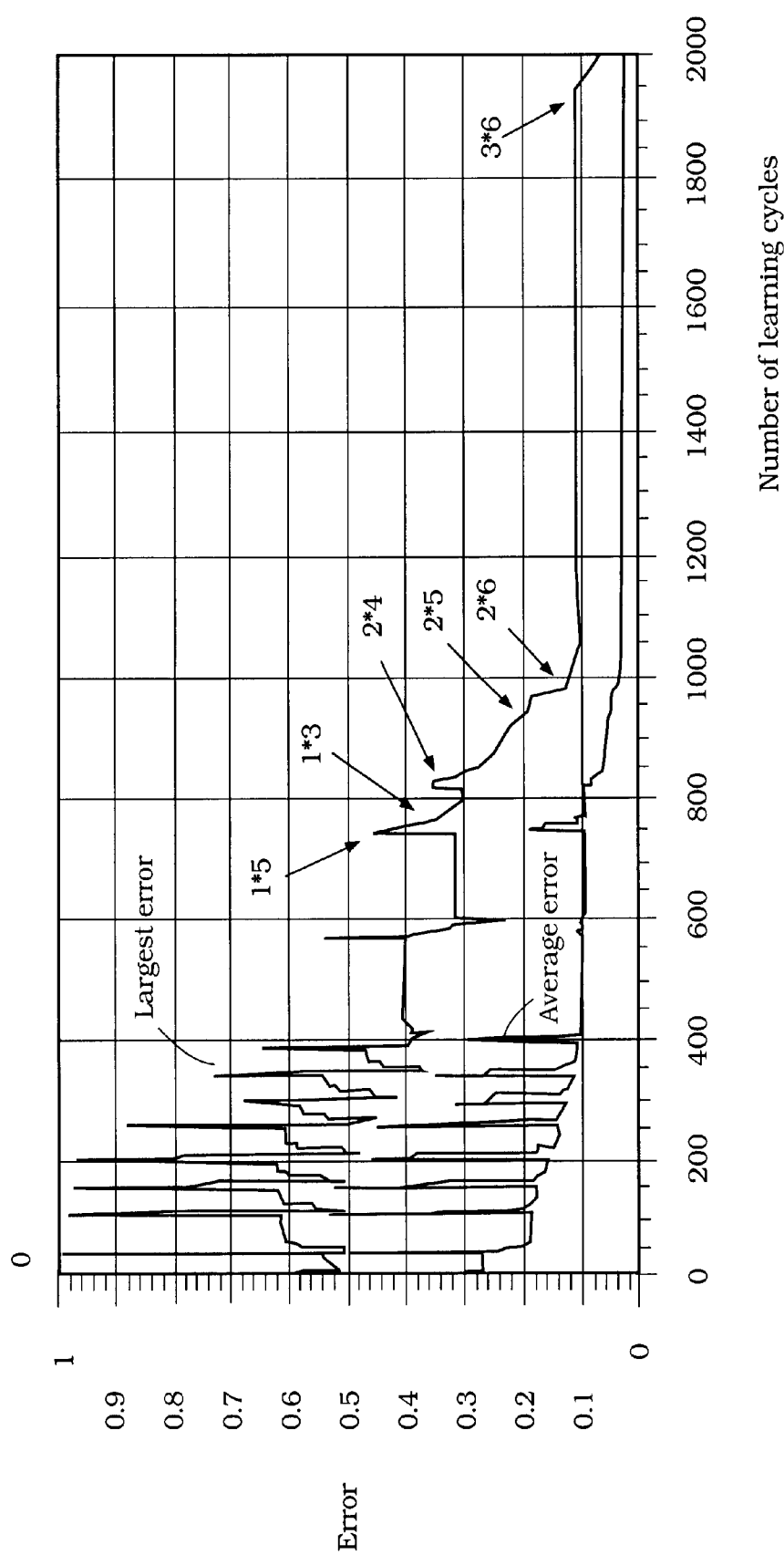
FIG. 17 is a schematic view showing the relationship between the number of learning cycles, the maximum error, and the average error.
Figure 18:
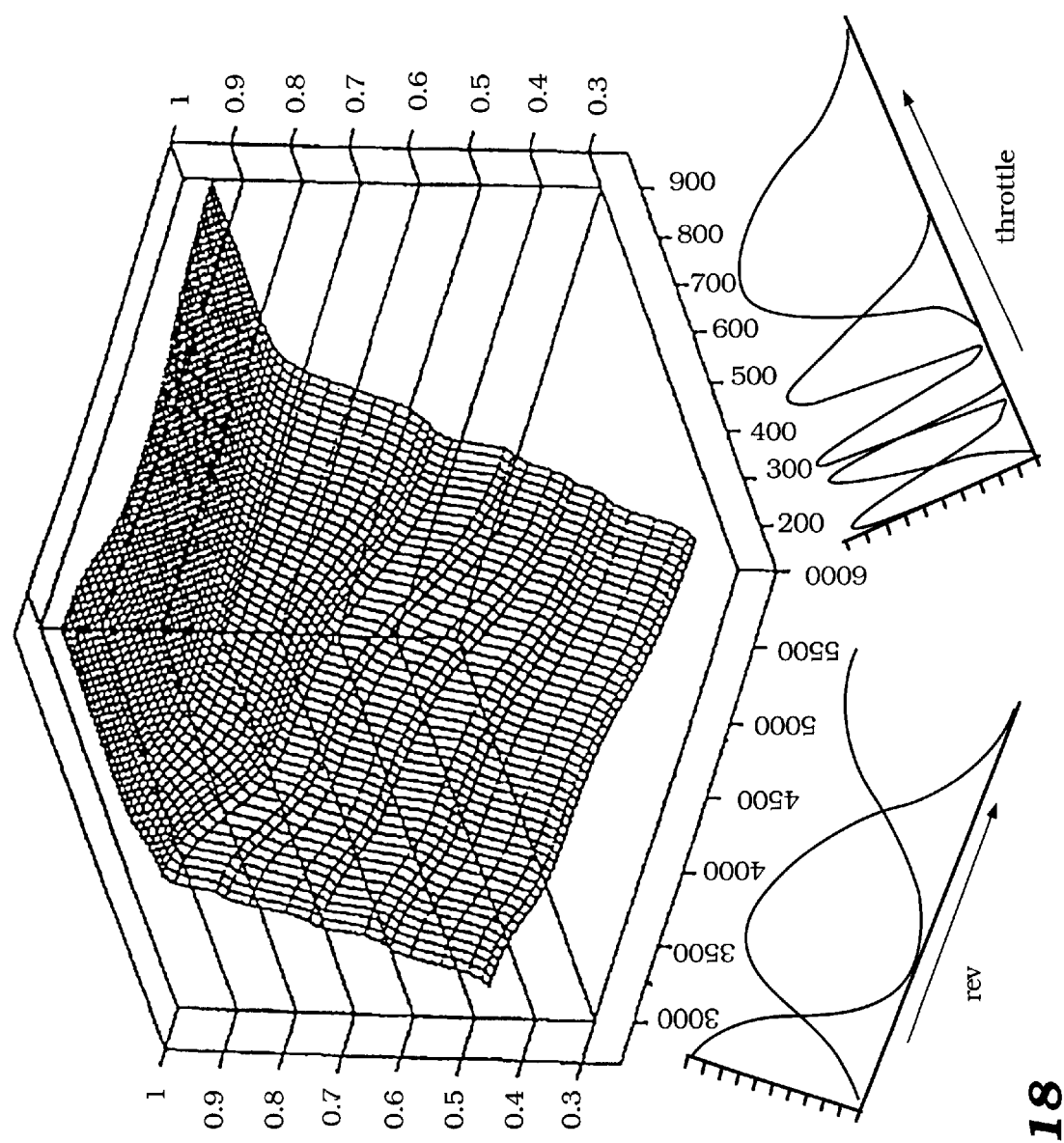
FIG. 18 is a schematic view showing the relationship between the input and output of the fuzzy neural network having 18 fuzzy rules (3×6=18) obtained upon learning.

FIGS. 17 and 18 show the results from simulation of initial learning using the aforesaid autonomic system for constituting a fuzzy neural network, wherein the engine speed and the throttle angle are used as input information, and 100 experimental data of volumetric efficiency are used as teacher data and applied to a fuzzy neural network which outputs volumetric efficiency and which has not undergone learning (i.e., no membership functions nor fuzzy rules). FIG. 17 is a schematic view showing the relationship between the number of learning cycles, the maximum error, and the average error. FIG. 18 is a schematic view showing the relationship between the input and output of the fuzzy neural network having 18 fuzzy rules (3×6=18) obtained upon learning. The conditions were as follows:

Experimental Conditions to Obtain Teacher Data:
(1) Engine Speed: 3,000–6,000 r.p.m.
(2) Throttle Angle: 10°–90° (full open)
(3) Measuring Points of Volumetric Efficiency: 100 points were randomly selected throughout the entire region.

Simulation Conditions:
(1) Learning Coefficient:
   wc: 0.0001×0.016667
   wg: 0.0001×30.0
   wf: 0.002
(2) Conditions for Addition of Rules:
   $E(n) < \alpha E(n-1) \rightarrow$ Not added.
   $E(n) \geq \alpha E(n-1) \rightarrow$ Added.
   E: Average Error
   n: The Number of Learning cycles
   α: 0.99995
(3) Conditions of Initial Values of Coupling Coefficients of Added Rules:
   wc: An intermediate value between the peak of an added membership function and the peak of an adjacent membership function was used as an initial value.
   wg: A value which smoothly connects the peak of an added membership function and intermediate value wc was used as an initial value.
   wf: The input domain at the second-half portion was divided into 1,024 segments (32×32=1,024), it was checked whether teacher data exist in a segment corresponding to a candidate added rule: If there were teacher data, the teacher data were used as initial values. If there were no teacher data, values obtained by linear interpolation of coupling coefficients wf at the second-half portion on both side of the rule were used as initial values.
(4) Conditions of Linearity Evaluation:
   In comparing coupling coefficient wf related to a membership function which is an object to be evaluated and a value obtained by linear interpolation of coupling coefficients wf related to membership functions on both sides, if the difference therebetween was no more than 0.03, linearity was considered to be established. In the above, the values used above are normalized in such a way that the difference between the maximum value and the minimum value of teacher data was set at 1 (one).
(5) The Number of Learning Cycles: 2,000

As shown in the learning process in FIG. 17, it is understood that, after 1,000-time learning cycles, the average error and the maximum error were both stabilized within acceptably low ranges, as learning progressed from the state where the number of the fuzzy rules and the membership function was 0 (zero) to the state where the addition and the deletion of fuzzy rules were conducted, thereby reducing the errors. Upon completion of 2,000-time learning cycles, there were three membership functions in the direction related to the engine speed, and there were six membership functions in the direction related to the throttle angle, and as a result, 18 fuzzy rules were obtained. The average error was 0.024947, and the maximum error was 0.069343, both of which were within permissible ranges.

Also in view of the simulation results, it is understood that, according to the aforesaid autonomic system for constituting a fuzzy neural network, only by adding teacher data is it possible for the fuzzy neural network, which did not undergo learning, to obtain membership functions and fuzzy rules providing the appropriate input-output relationship in an autonomic manner.

In the above, referring back to the explanation of the air flow forward model 21 in FIG. 4, the air flow forward model 21 estimates the estimated air volume Av using the above-described models for air volume, intake pressure, and volumetric efficiency.

Learning signal Fb in the fuzzy neural network in the volumetric efficiency estimation unit 21e is inputted from the feedback control unit 30.

Fuel Deposition Forward Model

Figure 19:
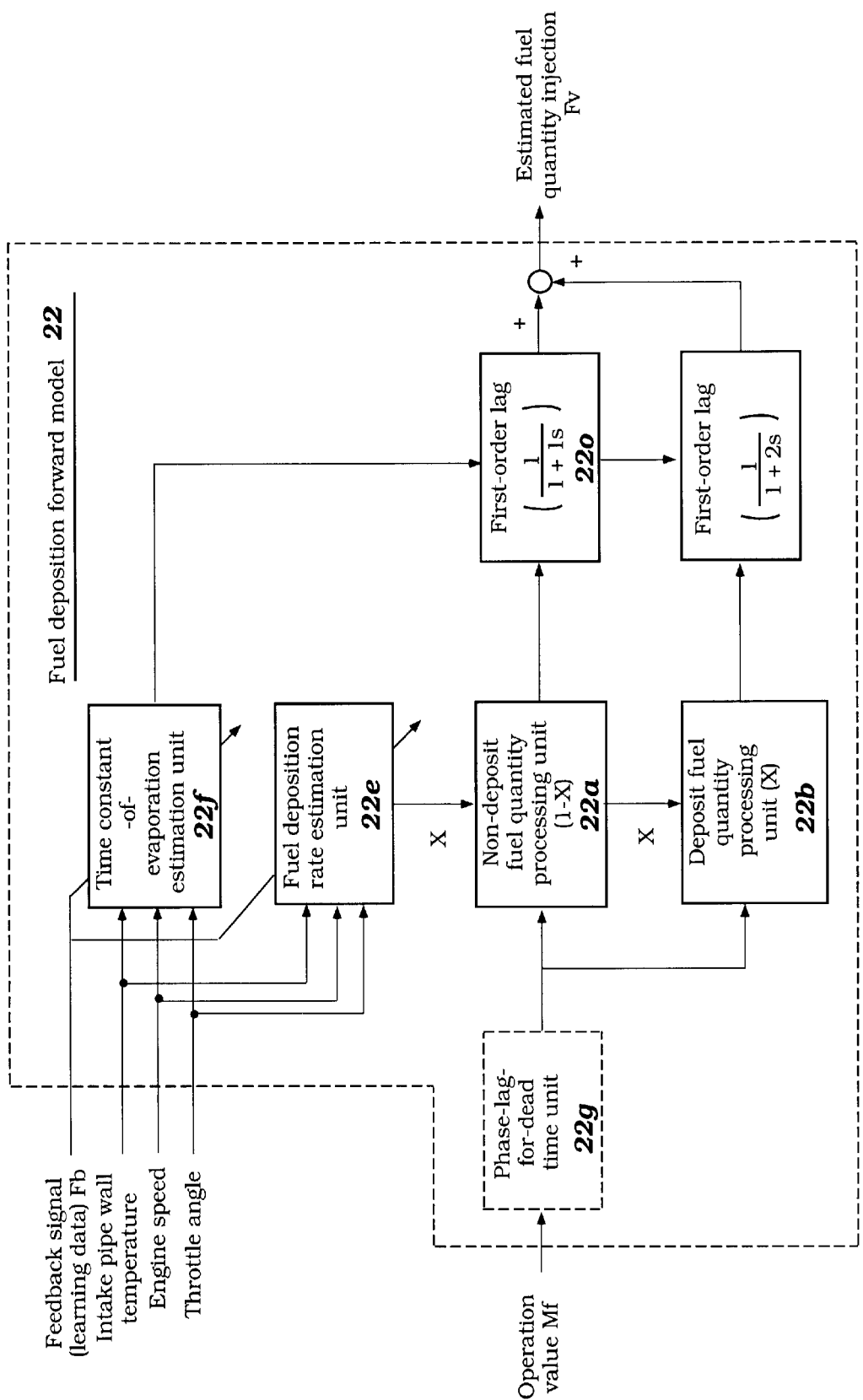
FIG. 19 is a schematic block diagram showing the structures of the fuel deposition forward model illustrated in FIG. 3.

FIG. 19 is a schematic block diagram showing the structures of the fuel deposition forward model 22. This fuel deposition forward model 22 is constituted by modeling the behavior of fuel injected from the fuel injector 5 as described above.

The fuel deposition forward model 22 comprises a non-deposit fuel processing unit 22a, a deposit fuel processing unit 22b, a first-order lag units 22c, 22d, a fuel deposition rate estimation unit 22e, and a time constant-of-evaporation estimation unit 22f. The fuel deposition forward model estimates a quantity Fv of fuel actually introduced into the cylinder 8 based on the basic operation value Mf (fuel injection quantity) inputted from the aforesaid basic operation value processing unit 24.

Figure 20:
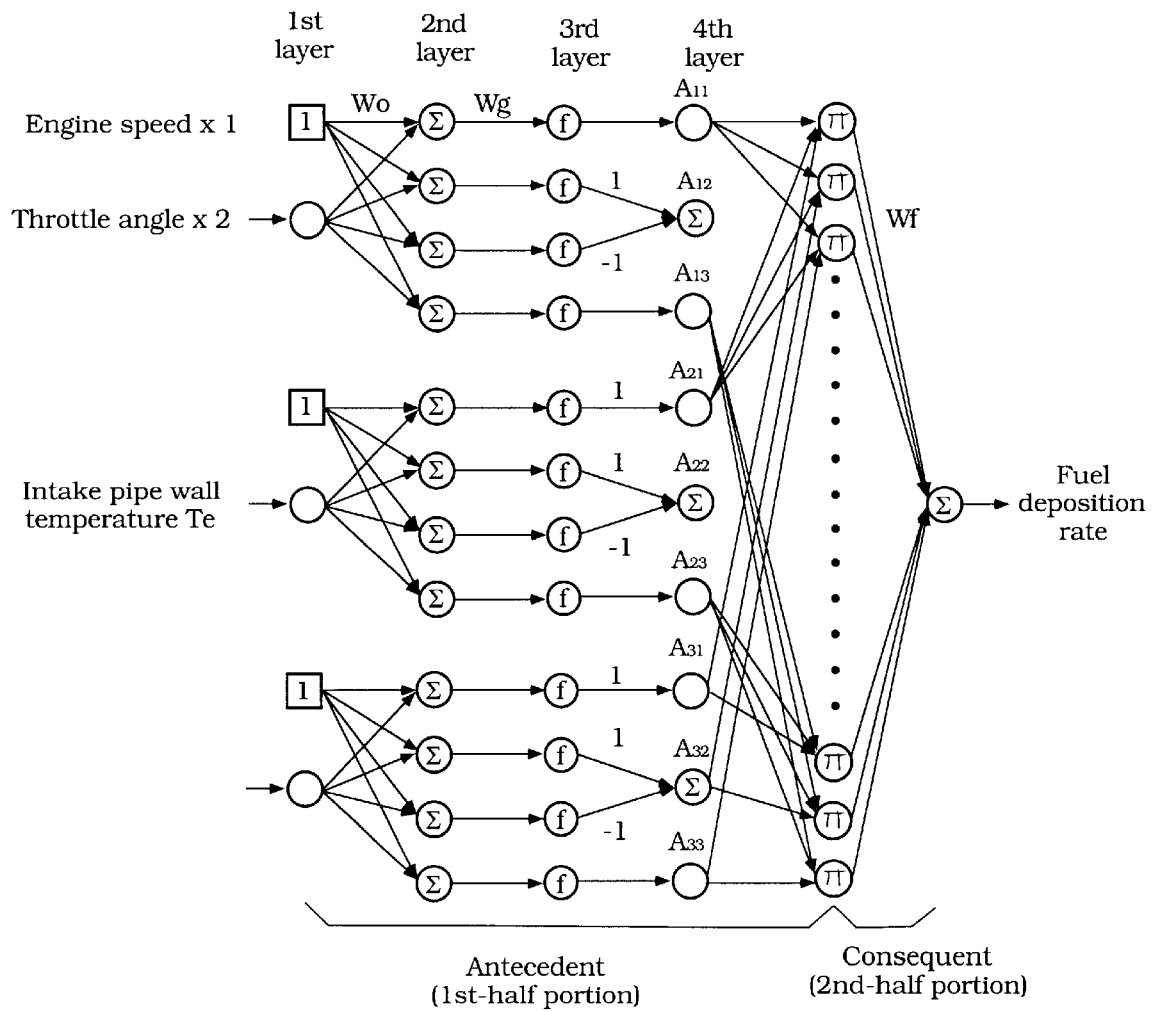
FIG. 20 is a schematic diagram showing a fuzzy neural network for determining the fuel deposition rate r, which is used in the fuel deposition rate estimation unit illustrated in FIG. 19.

The fuel deposition rate estimation unit 22e receives the engine speed signal x1 and the throttle angle signal x2, and based on the above information, estimates the ratio X (hereinafter referred to as "fuel deposition ratio r") of the fuel deposited on a wall of the intake pipe 4 to the fuel injected by the fuel injector 5 (FIG. 20).

Figure 21:
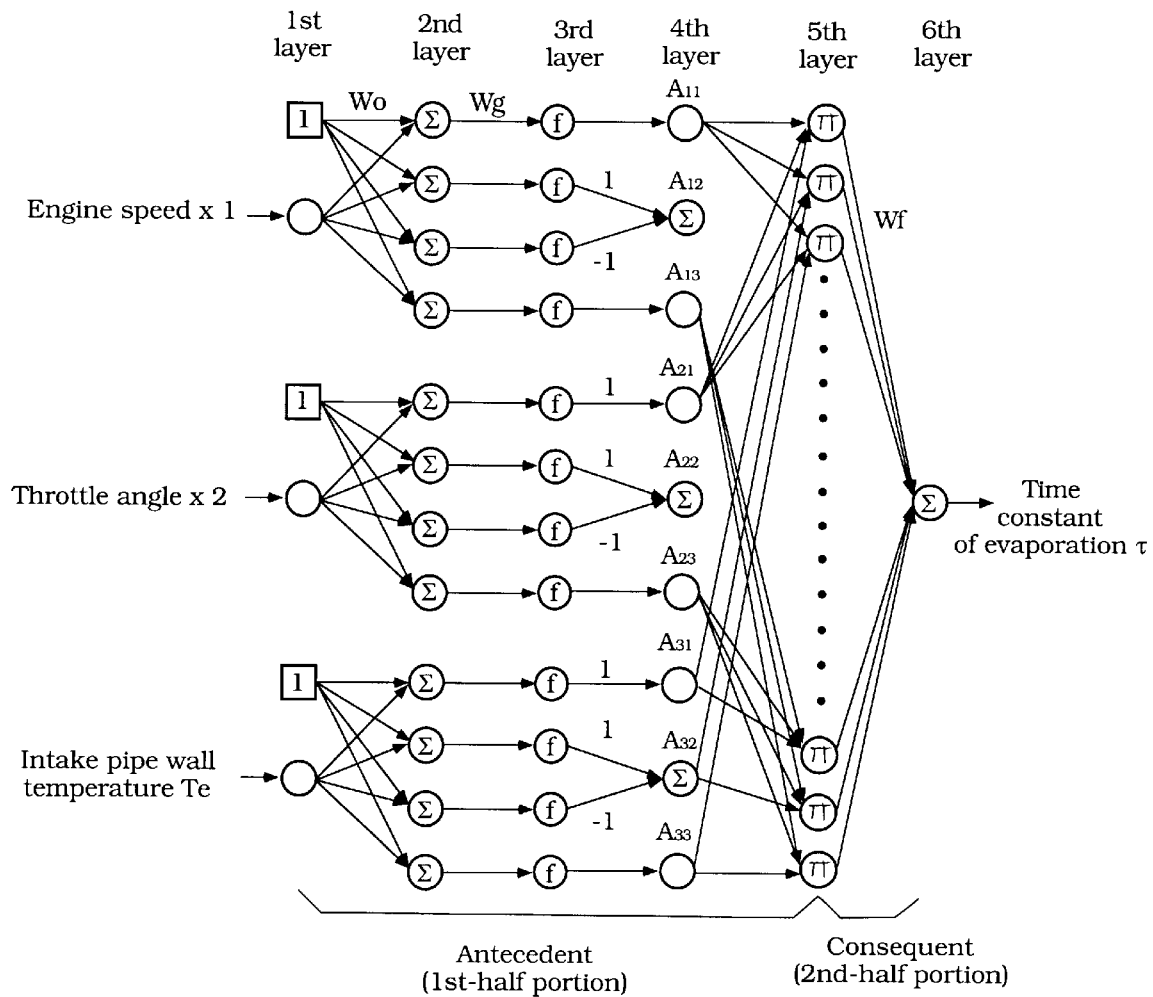
FIG. 21 is a schematic diagram of a fuzzy neural network for determining time constant of evaporation, which is used in the time constant-of-evaporation estimation unit illustrated in FIG. 19.

The time constant-of-evaporation estimation unit 22f comprises a fuzzy neural network which receives the engine speed signal x1, the throttle angle signal x2, and the intake pipe wall temperature Te (the temperature of engine water), and which outputs time constant τ for evaporation of the fuel deposited on the wall (hereinafter, referred to as "time constant of evaporation τ") (FIG. 21).

The non-deposit fuel processing unit 22a estimates the fuel quantity entering directly the cylinder 8 from the fuel injector 5 at the basic fuel injection quantity Mf (operation value) inputted from the basic operation value processing unit 24.

The deposit fuel processing unit 22b estimates the fuel quantity entering the cylinder 8 after once being deposited on a wall at the basic fuel injection quantity Mf (operation value) inputted from the basic operation value processing unit 24, based on the fuel deposition rate r outputted from the fuel deposition ratio estimation unit 22e.

The fuel quantity obtained by the non-deposit fuel processing unit 22a and the deposit fuel processing unit 22b are approximated to a first-order lag system based on the time constants of evaporation τ1 and τ2 obtained from the time constant-of-evaporation τestimation unit 22f, and then summed to output it as the estimated fuel quantity Fv from the fuel deposition forward model 22.

In the above, when modeling the behavior of fuel injected by the fuel injector 5 of the engine 1, a phase-lag unit for dead time 22g is normally necessary, as indicated in FIG. 19 with the broken line, to cause a phase lag to a degree corresponding to the dead time, by taking into consideration the dead time which is the time for the injected fuel to move from the fuel injector device 5 to the cylinder 8. However, in this embodiment, by causing a phase-lag in the fuel deposition forward model to a degree corresponding to the dead time, the need of the phase-lag unit for dead time 22g can be eliminated. Accordingly, the fuel deposition forward model 22 becomes a simple first-order lag system, and thus, when performing feedback control using output of the fuel deposition forward model 22, a large feedback gain can be used, thereby constituting an accurate inverse model which provides appropriate basic operation value even during a transient state.

Constitution and learning of fuzzy rules in the fuzzy neural networks in the fuel deposition ratio estimation unit 22e and the time constant-of-evaporation estimation unit 22f are conducted as in the volumetric efficiency estimation unit 21e. Data for learning Fb are obtained from the feedback control unit 30 as in the volumetric efficiency estimation unit 21e.

Feedback Control Unit

The feedback control unit 30 is used during on-line learning while the controller 10 actually controls the engine. The feedback control unit 30 receives the difference between the target control value Ep and the actual control value E, calculates appropriate learning data Fb based on the difference, and outputs Fb, when learning, to the volumetric efficiency estimation unit 21e, the fuel deposition ratio estimation unit 22e, and the time constant-of-evaporation estimation unit 22f.

Effects Exhibited in The Embodiment

As explained above, in the controller 10 of this embodiment, the volumetric efficiency estimation unit 21e, the fuel deposition ratio estimation unit 22e, and the time constant-of-evaporation estimation unit 22f in the air flow forward model 21 and the fuel deposition forward model 22 are constituted by fuzzy neural networks. Thus, it is possible to cause the models to match the actual engine due to the learning function by the fuzzy neural networks in the forward models 21 and 22, thereby constantly controlling the air-fuel ratio in the optimum range in accordance with changes in the surrounding environments or changes in the engine over time. FIG. 22 shows examples illustrating the relationship between the throttle angle and the air-fuel ratio (the throttle angle is shown in FIG. 22a) when the volumetric efficiency is not corrected (FIG. 22c), when the fuel deposition rate and the coefficient of evaporation are not corrected (FIG. 22d), and when the volumetric efficiency, the fuel deposition rate and the coefficient of evaporation are corrected due to learning (FIGS. 22b, 22c, and 22d).

Further, in the controller 10 of this embodiment, the fuzzy neural network in each model has the structure of an autonomic system to obtain the fuzzy rules and the membership functions. Thus, initial learning, which must be conducted for each engine, becomes very simple. Even when errors between the models and the actual engine caused by the environmental changes and changes in the engine over time cannot be satisfactorily fixed solely by the learning function, the models can be adjusted by changing the structures of the models, by themselves in an autonomic way, to match the models with the actual engine. Thus, it is possible to constantly control the air-fuel ratio of the engine in accordance with changes in the surrounding environments and changes in the engine over time even when the changes are intense or drastic, e.g., when impurities enter into the engine.

Further, the controller 10 of this embodiment has structures wherein the phases of the air flow forward model 21 and the fuel deposition forward model 22, which estimate the air volume Av and the fuel quantity Fv, are advanced to a degree equivalent to the dead time at the model-based controller 20, and wherein the estimated control value Ev, obtained based on the air volume Av and the fuel quantity Fv obtained from the air flow forward model 21 and the fuel deposition forward model 22, is subjected to feedback to obtain the operation value Mf, thereby constituting an inverse model. Using the inverse model, the fuel deposition forward model 22 included in the feedback group that constitutes the inverse model can simply be a first-order lag system, and thus, a large feedback gain can be used in the inverse model. Accordingly, as compared with map control, for example, the control system using the inverse model improves, to a great extent, controllability of the air-fuel ratio during a transient state of the engine, and prevents the air-fuel ratio from suddenly changing from the target value to a rich ratio or a lean ratio.

Other Features

As explained above with reference to this embodiment, in the fuzzy rule addition process, if average error E(n) after learning n times is judged to be larger than threshold value Th2 which is a value obtained by multiplying average error E(n−1) after learning n−1 times by coefficient $\alpha$ ($\alpha$<1: e.g., 0.99), learning is judged to be stagnant, and the addition of rules is conducted. Conditions for the addition of new rules are, however, not limited to the above. For example, when controlling the actual engine with the controller 10, the number of times when the differences between the control values and the target control values in all driving conditions occurring within a given time period are not in permissible ranges, or the average errors thereof, or the aforesaid errors, can be used as the standards, and fuzzy rules can be added to positions where unsatisfactory driving conditions most occur or where the errors are maximized. By changing the conditions for the addition of rules as above, changing the number of rules can be minimized, thereby minimizing the probability of temporal deterioration in controllability due to a temporal increase in errors upon the addition or deletion of fuzzy rules.

Further, in the aforesaid embodiment, the fuzzy neural networks for controlling are changed directly by the addition or deletion of rules or learning. However, the manner of changing the fuzzy neural networks is not limited to the above, and, for example, fuzzy neural networks for learning, which have the same structures and coupling coefficients as do the fuzzy neural networks for controlling, can be installed on a work memory, wherein the addition or deletion of rules are conducted in the fuzzy neural network for learning, and further, the fuzzy neural networks for learning undergo learning using the output of the fuzzy neural networks for controlling as teacher data. After completion of learning, the fuzzy neural networks for learning installed on the work memory can be used as the fuzzy neural networks for controlling. That is, after every completion of learning, fuzzy neural networks for learning and for controlling can be switched. Accordingly, it is possible to minimize the probability of temporal deterioration in controllability due to a temporal increase in errors upon the addition or deletion of fuzzy rules.

Figure 23:
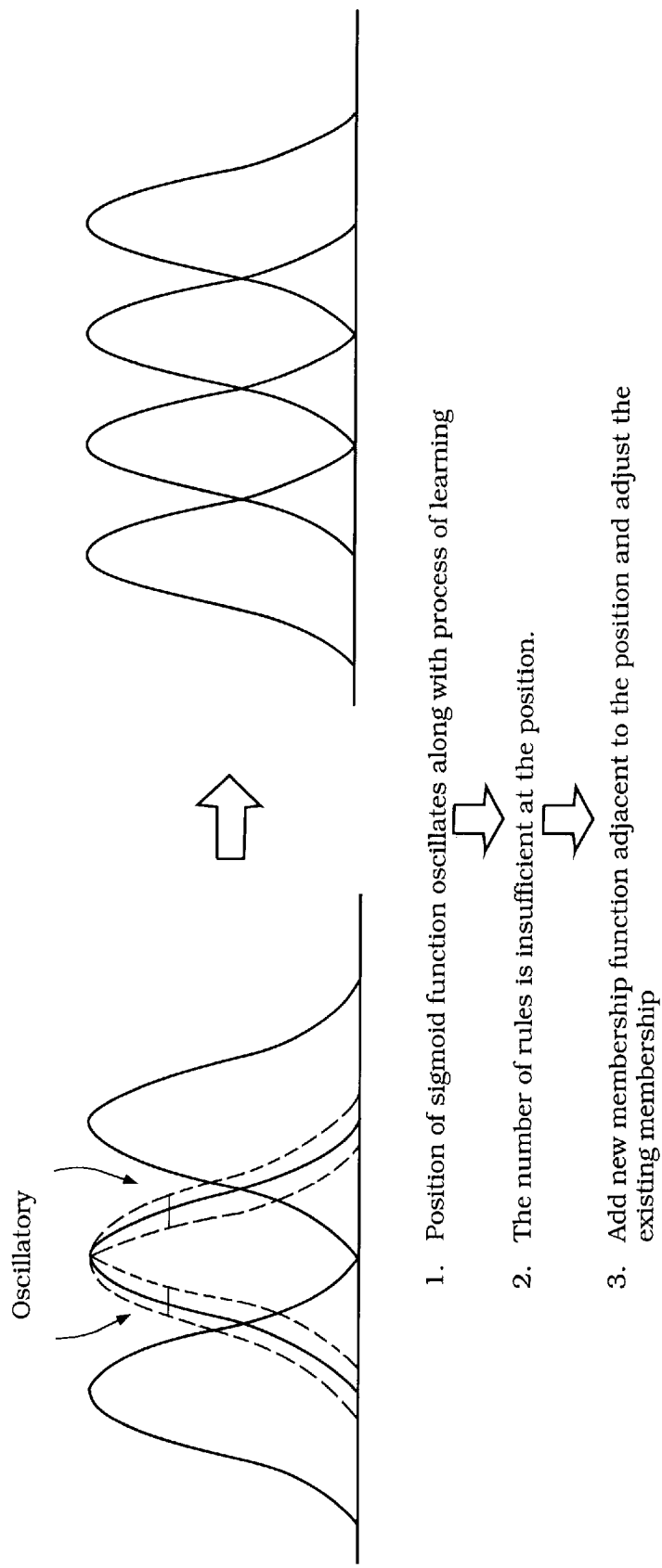
FIG. 23 is a schematic diagram showing a situation where a sigmoid function constituting a membership function oscillate during learning, and it can be interpreted that two positions scramble for the sigmoid function, i.e., there is an inadequate number of rules for the positions.

In addition, in the aforesaid embodiment, the timing of the addition of rules is judged based on the tendency of reducing errors, i.e., the difference between average error E(n) after learning n times and average error E(n−1) after learning n−1 times. However, the timing of the addition of rules is not limited to the above, and, for example, the timing can be judged based on the changes in the shapes of membership functions in the fuzzy neural networks, i.e, moving tendency of the central position and inclination. For example, as shown in FIG. 23, when a sigmoid function constituting a membership function oscillate during learning, it can be interpreted that two positions scramble for the sigmoid function, i.e., there is an inadequate number of rules for the positions. Thus, a membership function is added to satisfy the two positions. Accordingly, by judging the timing of the addition of rules based on the moving tendency of membership functions during learning, judgment can be made per membership function, and it is possible to add necessary fuzzy rules with certainty even if it is difficult to obtain accurate average errors due to uneven driving operation such as during actual driving.

Further, in the aforesaid embodiment, judgment as to whether fuzzy rules are added is made based on the distance between a membership function to be added and the existing membership equations. However, the judgment is not limited to the above, and, for example, the judgment can be made based on the multi-dimensional Euclidean distance between a membership function to be added and the existing membership equations; in particular, two-dimensional Euclidean distance can be used.

In the aforesaid embodiment, the autonomic system for constituting fuzzy neural networks of the present invention is explained with reference to the embodiment suitable for engine control. However, application of the autonomic system for constituting fuzzy neural networks of the present invention is not limited to the above, and the present invention can readily be adapted for various applications including: temperature control of an air conditioner which controls the room temperature at a comfortable temperature by monitoring the temperature, humidity, functioning time zone in the room, etc.; time control of a washing machine which controls rinsing time based on the volume of clothes, the water temperature, clarity of the drained water, etc.; temperature control of a refrigerator which controls the temperature in the storing space in such a way as to maintain the temperature during a time zone when the door is often opened or closed, and as to conserve electric energy during a time zone when the door is not opened or closed; control on an automatic transmission of a vehicle which controls the timing of shift-up and shift-down by evaluating the driver's driving characteristics or habits based on operations of the accelerator, break, gear shafting, etc.; cruise control which controls the speed of a vehicle based on the road surface conditions, road congestion, etc.; control on a power plant which controls generation of power by estimating consumption of electric power based on the season, time zone, weather, etc.; temperature control of a blast furnace which maintains the temperature regardless of the production output; control on bacteria in a sewage tank which controls propagation of the bacteria based on the temperature, weather, clarity in the tank, etc.; control on a robot for automatic conveyance which controls movement to avoid collision or contact by recognizing external conditions using information from sensors; control on a personal robot which judges the user's emotional state; and so forth.

Various Important Aspects of the Invention

As described above, the present invention includes various aspects as follows:

1) An autonomic system for constituting a fuzzy neural network comprises a process of calculating an estimated value using fuzzy inference which constitutes using a neural network structure, wherein a parameter to be adjusted (or identified) in the fuzzy inference is made to correspond to coupling loads which are updated by learning, thereby adjusting fuzzy rules and membership functions, characterized in that the addition and deletion of fuzzy rules are conducted in an autonomic manner, thereby obtaining appropriate numbers of fuzzy rules optimal for an object to be controlled. According to the above system, even if the object has strong non-linearity, fuzzy rules can be formatted in an autonomic manner.

2) In the autonomic system according to item 1), the addition of fuzzy rules is conducted based on judgment standards which are the tendency of reducing output errors and/or the tendency of changing coupling coefficients in the fuzzy neural network during learning. By using the tendency of reducing output errors as the judgment standards, judgment can be made in accordance with the progress of learning. Also, by using the tendency of changing coupling coefficients as the judgment standards, direct judgment can be made.

3) In the autonomic system according to item 2), the tendency of reducing errors is judged based on the average error and/or the maximum error in the output. The system allows efficiently adding fuzzy rules to positions where the addition of fuzzy rules is most required, i.e., where there is an inadequate number of fuzzy rules or there are inadequate fuzzy rules. Each of the following items 4) through 9) also exhibits the same advantages as above.

4) In the autonomic system according to item 3), when the decreasing tendency of errors is within a predetermined range, the position where the output errors are large is used as a candidate position having priority, to which fuzzy rules are added.

5) In the autonomic system according to item 4), the distance between a membership function for adding fuzzy rules at the candidate position and existing membership functions is checked for each input direction in the fuzzy neural network, and if the distance is within a predetermined range, the position where the largest errors subsequently found are created is selected as the candidate position.

6) In the autonomic system according to item 5), the addition of fuzzy rules is repeated until a membership function is added.

7) In the autonomic system according to item 5), the addition of fuzzy rules is repeated at predetermined times.

8) In the autonomic system according to item 2), the changing tendency of coupling coefficients is evaluated by a tendency of oscillation of coupling coefficients upon learning.

9) In the autonomic system according to item 8), if the tendency is oscillatory, a new membership function is added in the vicinity of the membership function related to the oscillatory coupling coefficients, thereby adding fuzzy rules.

10) In the autonomic system according to any one of items 1) through 9), during operation of the object, fuzzy rule(s) is/are added when an error in output cannot be controlled within a permissible range simply by updating the coupling loads through learning. The above system allows minimizing temporal deterioration of controllability occurring due to the addition of fuzzy rules during operation of the object.

11) In the autonomic system according to item 10), judgment as to whether the error in output is not in the permissible range is made based on at least one selected from the group consisting of: an average error, a maximum error, and the number of errors outside the permissible range within a given period of time. The above system allows judging whether to add fuzzy rules is conducted even during operation of the object to be controlled.

12) In the autonomic system according to item 11), the position, where the position of the maximum errors or the position of errors larger than a predetermined value is gathered, is selected as the candidate position having priority to which fuzzy rules are added. The above system also allows minimizing temporal deterioration of controllability occurring due to the addition of fuzzy rules during operation of the object.

13) In the autonomic system according to any one of items 1) through 12), linearity of coupling loads at the second-half portion of at least three membership functions in one input direction is determined, and if linearity of coupling coefficients is established, a fuzzy rule corresponding to at least one coupling load is deleted. This system allows preventing the structure from becoming unnecessarily complex by effectively deleting unnecessary fuzzy rules in an autonomic manner.

14) In the autonomic system according to item 13), linearity of the coupling load is used as the standard for judging deletion, and linearity in a multi-dimensional input domain is judged using a combination of one-dimensional linearities. This system allows simplifying calculation because judgment is simply made on one-dimensional linearity even if the number of dimensions of input increases.

15) In the autonomic system according to any one of items 1) through 14), which comprises at least one fuzzy neural network for controlling which actually controls the object to be controlled, the system further comprises at least one fuzzy neural network for learning which has the same structure and coupling loads as does the at least one fuzzy neural network for controlling, and the at least one fuzzy neural network for learning undergoes learning including the addition and deletion of at least one fuzzy rule, and after completion of learning, the at least one fuzzy neural network for learning is made to function as a fuzzy neural network for controlling. The above system allows minimizing temporal deterioration of controllability occurring due to the addition of fuzzy rules during operation of the object.

16) In the above autonomic system according to item 15), the input and output of the fuzzy neural network for controlling are used as teacher data for the fuzzy neural network for learning. This system does not require a memory to store teacher data, thereby simplifying data storage.

17) In the above autonomic system according to item 15) or 16), until the fuzzy neural network for learning completes learning, the fuzzy neural network for controlling does not undergo learning. This system prevents teacher data from being changed during learning.

18) In the above autonomic system according to any one of items 1) through 17), the system can be designed to have only a deletion function, or to have only an addition function, and can be used independently, depending on the intended use of the system. The present invention includes the above aspects.

19) A control system for controlling an object using at least one model which is obtained by modeling at least one part of the internal structures of the object, wherein the modeling is conducted using at least a fuzzy neural network which obtains appropriate numbers of fuzzy rules in an autonomic manner by adding and deleting fuzzy rules. This system allows easily and effectively controlling an object having high non-linearity since fuzzy rules can be obtained simply and efficiently, thereby efficiently modeling the object. Thus, the present invention can be applied to various types of objects.

20) In the control system according to item 19), the fuzzy neural network(s) is/are constituted according to any one of items 1) through 18).

21) In the control system according to item 19), the object to be controlled is an engine.

22) In the control system according to item 21), one of the models is an engine forward model.

23) In the control system according to item 21) or 22), the system further comprises an engine reverse model which constitutes a feedback loop for calculating an engine control value based on an estimated value obtained by feeding output from the engine forward model back to the model, and the engine is controlled by using at least a control value outputted from the reverse model.

24) In the control system according to item 21) or 22), the modeling is conducted with respect to behavior of air and/or fuel supplied into an engine combustion chamber, an estimated air-fuel ratio is calculated based on the output from the model, and a control value of a fuel injection is determined based on the estimated air-fuel ratio.

In items 21) through 24), when the present invention is applied to engine control as described above, the fuzzy neural network constituting the engine forward model undergoes the addition and deletion of fuzzy rules in an autonomic manner, thereby obtaining an optimal number of fuzzy rules. Thus, although the engine is an object having high non-linearity, fuzzy rules can be created automatically, and the engine forward model can be constructed easily. Further, even when errors between the forward models and the actual engine caused by the environmental changes and changes in the engine over time cannot be satisfactorily fixed solely by the learning function, the forward model can be adjusted by changing fuzzy rules in the fuzzy neural network of the model, by themselves in an autonomic way, to match the models with the actual engine.

25) In the control system according to item 24), the behavior of air includes a volumetric efficiency.

26) In the control system according to item 24), the behavior of fuel includes a fuel deposition rate and/or a time constant for evaporation. In items 25) and 26), by modeling the behaviors of air and fuel using the fuzzy neural networks, the system overcomes difficulties in modeling the behaviors of air and fuel due to factors which are not easily modeled using equations, such as a volumetric efficiency and a fuel deposition rate.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A control method for optimizing control of a machine by using a control unit including at least one control model of the machine, wherein
   (i) the model outputs a signal to control the machine when receiving input signals wherein the input-output relationship is regulated by at least one control parameter;
   (ii) the model includes a fuzzy neural network which has layers and receives as input at least two variables each having membership functions located in the layers, and which outputs said control parameter, wherein the input-output relationship is constituted using fuzzy rules formed by a combination of the membership functions, said control method comprising the steps of:
   (a) obtaining appropriate numbers of fuzzy rules in the fuzzy neural network by an autonomic method comprising:
      (I) training the fuzzy neural network to learn a relationship between input and output of the fuzzy neural network based on an error in output determined from teaching data, by changing coupling coefficients between adjacent layers, wherein the membership functions and the fuzzy rules are modified;
      (II) judging whether a change in an error in output or in coupling coefficients is within a predetermined range;
      (III) if the change is not within the predetermined range, adding to the fuzzy neural network a membership function related to at least one of the at least two variables, thereby adding fuzzy rules to the fuzzy neural network;
      (IV) judging whether any fuzzy rules are interpolated between the other fuzzy rules or extrapolated from the other fuzzy rules, wherein interpolation or extrapolation of a fuzzy rule corresponding to a membership function is determined based on linearity of coupling coefficients of at least two other membership functions with respect to one of the at least two variables; and (V) if linearity of coupling coefficients is established in a fuzzy rule, deleting the interpolated or extrapolated fuzzy rule; and (b) controlling the machine by using the at least one model with the updated fuzzy neural network.

2. The autonomic method according to claim 1, wherein the judgment of the addition of fuzzy rules is based on the tendency of reducing output errors or the tendency of changing coupling coefficients.

3. The autonomic method according to claim 2, wherein the tendency of reducing output errors is indicated using the average error and/or the maximum error in the output.

4. The autonomic method according to claim 3, wherein if the tendency of reducing errors is within a predetermined range, a position where the output errors are largest is selected as a candidate position to which a membership equation for adding fuzzy rules is added.

5. The autonomic method according to claim 4, wherein if the candidate position is close to the positions of the existing membership functions, a position where the largest errors subsequently found are created is selected as the candidate position.

6. The autonomic method according to claim 2, wherein the tendency of changing coupling coefficients is evaluated by a tendency of oscillation of coupling coefficients upon learning.

7. The autonomic method according to claim 6, wherein if the tendency is oscillatory, a membership function for adding fuzzy rules is added in the vicinity of the membership function related to the oscillatory coupling coefficients.

8. The autonomic method according to claim 1, wherein judgment as to whether the error in output is not in the permissible range is made based on at least one selected from the group consisting of an average error, a maximum error, and the number of errors outside the permissible range within a given period of time.

9. The autonomic method according to claim 8, wherein the position, where the position of the maximum errors or the position of errors larger than a predetermined value is gathered, is selected as a candidate position having priority to which a membership function is added.

10. The autonomic method according to claim 1, wherein linearity of the coupling coefficients is one-dimensional.

11. The control method according to claim 1, wherein the machine to be controlled is an engine.

12. The control method according to claim 11, wherein one of the at least one model is a forward model.

13. The control method according to claim 12, wherein one of the at least one model is a reverse model which constitutes a feedback loop for calculating an engine control value based on an estimated value obtained by feeding output from the forward model back to the forward model, and wherein the engine is controlled by using at least a control value outputted from the reverse model.

14. The control method according to claim 11, wherein the modeling is conducted with respect to behavior of air and/or fuel supplied into an engine combustion chamber, and wherein an estimated air-fuel ratio is calculated based on the output from the model, and a control value of a fuel injection is determined based on the estimated air-fuel ratio.

15. The control method according to 14, wherein the behavior of air includes a volumetric efficiency.

16. The control method according to 14, wherein the behavior of fuel includes a fuel deposition rate and/or a time constant for evaporation.

17. The control method according to claim 11, wherein the model comprises at least one fuzzy neural network for controlling which actually controls the object to be controlled, and at least one fuzzy neural network for learning which has the same structure and coupling coefficients as does the at least one fuzzy neural network for controlling, said method further comprising the step of switching the at least one fuzzy neural network for controlling and the at least one fuzzy neural network for learning after every completion of learning of whichever fuzzy neural networks are subjected to learning, wherein the at least one fuzzy neural network for learning is caused to undergo learning including the addition and deletion of at least one fuzzy rule.

18. The control method according to claim 17, wherein the input and output of the fuzzy neural network for controlling are used as teacher data for the fuzzy neural network for learning.

19. A control method for optimizing control of a machine by using a control unit including at least one control model of the machine, wherein (i) the model outputs a signal to control the machine when receiving input signals wherein the input-output relationship is regulated by at least one control parameter;

(ii) the model includes a fuzzy neural network which has layers and receives as input at least two variables each having membership functions located in the layers, and which outputs said control parameter, wherein the input-output relationship is constituted using fuzzy rules formed by a combination of the membership functions, said control method comprising the steps of:

(a) obtaining appropriate numbers of fuzzy rules in the fuzzy neural network by an autonomic method comprising:

(I) training the fuzzy neural network to learn a relationship between input and output of the fuzzy neural network based on an error in output determined from teaching data, by changing coupling coefficients between adjacent layers, wherein the membership functions and the fuzzy rules are modified;

(II) judging whether any fuzzy rules are interpolated between the other fuzzy rules or extrapolated from the other fuzzy rules, wherein interpolation or extrapolation of a fuzzy rule corresponding to a membership function is determined based on linearity of coupling coefficients of at least two other membership functions with respect to one of the at least two variables; and (III) if linearity of coupling coefficients is established, deleting the interpolated or extrapolated fuzzy rule; and (b) controlling the machine by using the at least one model with the updated fuzzy neural network.

* * * * *